United States Patent
Komatsu

(10) Patent No.: US 10,059,223 B2
(45) Date of Patent: Aug. 28, 2018

(54) POWER SUPPLY CONTROL APPARATUS AND POWER SUPPLY CONTROL METHOD

(71) Applicant: HONDA MOTOR CO., LTD., Tokyo (JP)

(72) Inventor: Masaaki Komatsu, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 365 days.

(21) Appl. No.: 14/772,208

(22) PCT Filed: Feb. 21, 2014

(86) PCT No.: PCT/JP2014/054216
§ 371 (c)(1),
(2) Date: Sep. 2, 2015

(87) PCT Pub. No.: WO2014/136592
PCT Pub. Date: Sep. 12, 2014

(65) Prior Publication Data
US 2016/0031341 A1    Feb. 4, 2016

(30) Foreign Application Priority Data

Mar. 7, 2013   (JP) ................................. 2013-045708
Mar. 29, 2013  (JP) ................................. 2013-074747

(51) Int. Cl.
*B60L 11/18*      (2006.01)
*B60L 11/12*      (2006.01)
(Continued)

(52) U.S. Cl.
CPC ......... *B60L 11/1877* (2013.01); *B60L 11/126* (2013.01); *B60L 11/14* (2013.01);
(Continued)

(58) Field of Classification Search
CPC .............. B60L 11/1877; B60L 11/1803; B60L 11/1855; B60L 2210/40; B60L 2210/10; Y02T 10/6217; Y02T 10/645
See application file for complete search history.

(56) References Cited

U.S. PATENT DOCUMENTS 5,418,402 A * 5/1995 Fujiwara ............... H02J 7/1423
                                                    307/10.1
5,898,291 A * 4/1999 Hall ..................... H02J 7/0026
                                                    320/118
(Continued)

FOREIGN PATENT DOCUMENTS

CN   1176195 A    3/1998
CN   102161331 A  8/2011
(Continued)

OTHER PUBLICATIONS

Extended (Supplementary) European Search Report dated Nov. 2, 2016, issued in counterpart European Patent Application No. 14760102.5. (8 pages).
(Continued)

*Primary Examiner* — Rexford Barnie
*Assistant Examiner* — Terrance Willoughby
(74) *Attorney, Agent, or Firm* — Westerman, Hattori, Daniels & Adrian, LLP

(57) ABSTRACT

A power supply control apparatus for a vehicle having a battery portion having a plurality of batteries of which a connection mode is switched to a series mode or a parallel mode, a device which can give or be given electric power to or from the battery portion, and a switching portion which switches the connection mode of the batteries to a series mode or a parallel mode has requiring portions which output respective requirements of the battery portion and the device in relation to the connection mode of the batteries based on respective conditions of the battery portion and the device,
(Continued)

a determination portion which determines which of a series requirement and a parallel requirement is greater in number, and a determination.

12 Claims, 16 Drawing Sheets

(51) Int. Cl.
*B60L 11/14* (2006.01)
*B60L 15/00* (2006.01)
*H02J 7/00* (2006.01)
*H02J 7/14* (2006.01)

(52) U.S. Cl.
CPC ....... *B60L 11/1803* (2013.01); *B60L 11/1811* (2013.01); *B60L 11/1855* (2013.01); *B60L 11/1861* (2013.01); *B60L 11/1864* (2013.01); *B60L 15/007* (2013.01); *H02J 7/0024* (2013.01); *H02J 7/1423* (2013.01); *B60L 2210/10* (2013.01); *B60L 2210/40* (2013.01); *Y02T 10/6217* (2013.01); *Y02T 10/645* (2013.01); *Y02T 10/7005* (2013.01); *Y02T 10/7044* (2013.01); *Y02T 10/7055* (2013.01); *Y02T 10/7061* (2013.01); *Y02T 10/7077* (2013.01); *Y02T 10/7216* (2013.01); *Y02T 10/7241* (2013.01)

(56) References Cited

U.S. PATENT DOCUMENTS

| | | | |
|---|---|---|---|
| 5,932,932 | A | 8/1999 | Agatsuma et al. |
| 5,960,898 | A | 10/1999 | Okada et al. |
| 2006/0164034 | A1 | 7/2006 | Hanyu et al. |
| 2010/0280683 | A1 | 11/2010 | Miyauchi |
| 2011/0202197 | A1 | 8/2011 | Hachiya et al. |

FOREIGN PATENT DOCUMENTS

| | | | |
|---|---|---|---|
| FR | 2973177 | A1 | 9/2012 |
| JP | 10-94182 | A | 4/1998 |
| JP | 2005-287222 | A | 10/2005 |
| JP | 2007-36597 | A | 2/2007 |
| JP | 2008-131830 | A | 6/2008 |
| JP | 2010-57288 | A | 3/2010 |
| JP | 2011-172318 | A | 9/2011 |
| JP | 2012-60838 | A | 3/2012 |
| JP | 2012-70514 | A | 4/2012 |
| JP | 2012-152079 | A | 8/2012 |
| JP | 2012-152080 | A | 8/2012 |
| WO | 2009/072473 | A1 | 6/2009 |

OTHER PUBLICATIONS

International Search Report dated May 13, 2014, issued in counterpart International Application No. PCT/JP2014/054216 (2 pages).
Office Action dated Jul. 20, 2016, issued in Chinese Patent Application No. 201480010301.0, with English translation. (10 pages).

* cited by examiner

|   | Device | Requirement reason | Requirement | Degree of priority |
|---|---|---|---|---|
| A | System | System efficiency | Parallel | Low |
|   |   |   | Series | Low |
| B | MOT | Inverter overheat protection | Parallel | High |
| C | BATT | BATT output limit | Holding | High |
| D | MOT | TRC output securing | Series | Medium |
| E | GEN | GEN output securing | Series | Medium |
| F | System | Protection of overvoltage by regenerative current | Parallel | High |
| G | CONV | Reactor overheat protection | Holding | High |

FIG. 4

| | Priority of rule | Rule |
|---|---|---|
| a | 1 | Parallel requirement is selected in the case parallel requirement (high) and series requirement (high) are both present simultaneously. |
| b | 2 | Series requirement is selected in the case parallel requirement (medium) and series requirement (medium) are both present simultaneously and the number of series requirements (medium) is equal to the number of parallel requirements (medium). |
| c | 2 | A requirement which is the greatest in number is adopted out of requirements with the highest degree of priority. |
| d | 3 | System efficiency is adopted out of requirements with the highest degree of priority when the number of parallel requirements is equal to the number of series equipments. |
| e | ※ | Holding requirement is to be the current mode. For example, parallel requirement in the case of parallel mode, series requirement in the case of series mode. |

FIG. 5

POWER SUPPLY CONTROL APPARATUS AND POWER SUPPLY CONTROL METHOD

TECHNICAL FIELD

The present invention relates to a power supply control apparatus and a power supply control method by which a connection mode of a plurality of batteries can be switched to a series or a parallel mode.

BACKGROUND ART

FIG. 13 is a block diagram of an electric vehicle power supply apparatus which is disclosed in patent literature 1. In an electric vehicle power supply apparatus 1 shown in FIG. 13, in the event that the load of an motor (M) 2 is small and that a driving voltage required by the motor (M) 2 is small, a first switch (SW1) 14 is off (open) and a second switch (SW2) 15 is on (closed), so that a first battery 11 and a second battery 12 are connected parallel to each other with respect to a driving inverter 3 for the motor (M) 2. On the other hand, in the event that the load of the motor (M) 2 is great and that a driving voltage required by the motor (M) 2 is great, the first switch (SW1) 14 is on and the second switch (SW2) 15 is off, so that the first battery 11 and the second battery 12 are connected in series with each other with respect to the driving inverter 3 for the motor (M) 2. In this way, in the event that the load of the motor (M) 2 is great, the driving voltage of the motor (M) 2 is increased so that a desired motor performance can be ensured, whereas in the event that the load of the motor (M) 2 is small, the driving voltage of the motor (M) 2 is prevented from being excessive so that the operation efficiencies of the motor (M) 2 and the driving inverter 3 can be increased.

In addition, in the electric vehicle power supply apparatus 1, in the event that the connection of the first battery 11 and the second battery 12 is switched from the parallel to the series in response to an increase in load of the motor (M) 2, the first switch (SW1) 14 and the second switch (SW2) 15 are off, so that the second battery 12 is cut off from the motor (M) 2, whereby electric power is supplied to the motor (M) 2 only by the first battery 11. Then, a DC-DC converter 13 continues to perform a boosting or voltage increasing operation until an electric potential VB at a second node B which is connected to the first switch (SW1) 14 becomes equal to the electric potential VC of a third node C which is connected to the first switch (SW1) 14, whereafter the DC-DC converter 13 stops performing the voltage increasing operation and the first switch (SW1) 14 is closed to be on. In this way, with the electric power supply to the motor (M) 2 maintained, the connection of the first battery 11 and the second battery 12 with respect to the motor (M) 2 is switched between the parallel and the series in response to the increase in load of the motor (M)2. By activating the DC-DC converter 13 to operate only when the connection of the first battery 11 and the second battery 12 is switched, compared with a case where the DC-DC converter 13 is kept operating at all times, it is possible to restrict an increase in switching loss in the DC-DC converter 13.

RELATED ART LITERATURE

Patent Literature

Patent Literature 1: JP-A-2012-152079
Patent Literature 2: JP-A-2012-152080
Patent Literature 3: JP-A-2012-057288
Patent Literature 4: JP-A-2012-131830
Patent Literature 5: JP-A-2012-060838
Patent Literature 6: JP-A-2012-070514

SUMMARY OF THE INVENTION

Problem that the Invention is to Solve

In the vehicle on which the electric vehicle power supply apparatus 1 of patent literature 1 is controlled based on a predetermined rule according to conditions of various devices such as the motor, the generator, the battery and the like in addition to the magnitude of the driving voltage which is required on the motor. In the case there occurs a change or addition to the devices mounted on the vehicle, the rule needs to be modified according to the change or addition.

An object of the invention is to provide a power supply control apparatus and a power supply control method by which a connection mode of a plurality of batteries can be switched to a series or a parallel mode and which can still continue to be used without a large modification even in the case there occurs a change or addition to devices mounted on a vehicle.

Means for Solving the Problem

With a view to achieving the object, according to an invention in claim 1, there is provided a power supply control apparatus for a vehicle having a battery portion (for example, batteries 1101, 2101 in embodiments which will be described later) having a plurality of batteries (for example, first batteries 1103a, 2103a and second batteries 1103b, 2103b in the embodiments which will be described later) of which a connection mode is switched to a series mode or a parallel mode, at least one device (for example, motors 1107, 2107, generators 1111, 2111 in the embodiments which will be described later) which can give or be given electric power to or from the battery portion, and a series/parallel switching portion (for example, series/parallel switching portions 1120, 2120 in the embodiments which will be described later) which switches the connection mode of the plurality of batteries to a series mode or a parallel mode, the power supply control apparatus has a plurality of series/parallel requiring portions (for example, voltage step-up/down ECUs 1122, 2122, motor ECUs 1122, 2122, generator ECUs 1124, 2124, battery ECUs 1128, 21228 in embodiments which will be described later) which are provided individually for the battery portion and the device, and which outputs respective requirements of the battery portion and the device in relation to the connection mode of the plurality of batteries based on respective conditions of the battery portion and the device, a series/parallel requirement determination portion (for example, a series/parallel determination portion 1129 in the embodiments which will be described later) which determines which is greater in number between a series requirement and a parallel requirement in requirements outputted from the series/parallel requiring portions, and a series/parallel determination portion (for example, the series/parallel determination portion 1129 in the embodiments which will be described later) which determines the connection mode of the plurality of batteries to be a series mode or a parallel mode at least based on a determination of the series/parallel requirement determination portion, wherein the series/parallel switching portion switches the connection mode of the plurality of batteries to a series mode or a parallel mode based on a determination of the series/parallel determination portion.

An invention according to claim 2 is the power supply control apparatus according to claim 1, wherein the device includes an motor (for example, motors 1107, 2107 in embodiments which will be described later) which constitutes a drive source of the vehicle at least and which can give or be given electric power to or from the battery portion, the series/parallel requiring portions output respective requirements of the battery portion and the device together with degrees of priority thereof, and the series/parallel requirement determination portion classifies the requirements outputted from the series/parallel requiring portions according to their degree of priority and determines which is greater in number between a series requirement and a parallel requirement in requirements having a highest degree of priority in the classified requirements.

An invention according to claim 3 is the power supply control apparatus according to claim 2, wherein in a case the series/parallel requirement determination portion determines that the number of series requirements is equal to the number of parallel requirements in the requirements having the highest degree of priority in the classified requirements, the series/parallel determination portion determines the connection mode of the plurality of batteries to be a series mode or a parallel mode according to the highest degree of priority.

An invention according to claim 4 is the power supply control apparatus according to claim 1 or 2, wherein the series/parallel determination portion determines the connection mode of the plurality of batteries to be a series mode or a parallel mode according to a connection requirement which is determined to be greater in number by the series/parallel requirement determination portion.

An invention according to claim 5 is the power supply control apparatus according to claim 1 or 2, further comprising: a system series/parallel requiring portion (for example, a system series/parallel requiring portion 1125 in the embodiments which will be described later) which outputs a requirement in relation to the connection mode of the plurality of batteries based on an efficiency of the whole of the vehicle, wherein the series/parallel requirement determination portion determines which is greater in number between a series requirement and a parallel requirement based on requirements which are outputted from the series/parallel requiring portions and the system series/parallel requiring portion.

An invention according to claim 6 is the power supply control apparatus according to claim 5, wherein in a case the series/parallel requirement determination portion determines that the number of series requirements is equal to the number of parallel requirements, the series/parallel determination portion determines the connection mode of the plurality of batteries to be a series mode or a parallel mode according to the requirement of the system series/parallel requiring portion.

An invention according to claim 7 is the power supply control apparatus according to any one of claims 1 to 6, wherein when an output of the device is increased according to a required output for the vehicle in a state that the plurality of batteries are connected in parallel, the series/parallel determination portion starts a switching operation of switching the connection mode from the parallel mode to a series mode before the output of the device reaches an output limit value for a state where the connection mode is being switched.

An invention according to claim 8 is the power supply control apparatus according to claim 7, wherein the series/parallel determination portion starts a switching operation of switching the connection mode from the parallel mode to a series mode when the output of the device reaches a value resulting from subtracting an integrated value of a maximum value of a variation in the required output per unit time and a time which is required for the connection mode to be switched fro the parallel mode to a series mode from the output limit value.

An invention according to claim 9 is the power supply control apparatus according to claim 8, wherein the maximum value of a variation in the required output per unit time is a value resulting when a rate at which the required output changes to increase is maximum with an accelerator pedal depressed to a maximum extent by a driver of the vehicle.

With a view to achieving the object, according to an invention in claim 10, there is provided a power supply control method for a vehicle having a battery portion (for example, batteries 1101, 2101 in embodiments which will be described later) having a plurality of batteries (for example, first batteries 1103*a*, 2103*a* and second batteries 1103*b*, 2103*b* in the embodiments which will be described later) of which a connection mode is switched to a series mode or a parallel mode, at least one device (for example, motor 1107, 2107, generators 1111, 2111 in the embodiments which will be described later) which can give or be given electric power to or from the battery portion and a series/parallel switching portion (for example, series/parallel switching portions 1120, 2120 in the embodiments which will be described later) which switches the connection mode of the plurality of batteries to a series mode or a parallel mode, the power supply control method has a series/parallel requirement receiving step of receiving respective requirements of the battery portion and the device in relation to the connection mode of the plurality of batteries based on respective conditions of the battery portion and the device, a series/parallel requirement determination step of determining which is greater in number between a series requirement and a parallel requirement in requirements, and a series/parallel determination step of determining the connection mode of the plurality of batteries to be a series mode or a parallel mode at least based on the determination, wherein the series/parallel switching portion switches the connection mode of the plurality of batteries to a series mode or a parallel mode based on the determination, the device includes an motor which constitutes a drive source of the vehicle at least and which can give or be given electric power to or from the battery portion, in the series/parallel requirement receiving step, respective requirements of the battery portion and the device together with degrees of priority thereof, and in the series/parallel requirement determination step, the requirements which are received in the series/parallel requirement receiving step are classified according to their degree of priority and it is determined which is greater in number between a series requirement and a parallel requirement in requirements having a highest degree of priority in the classified requirements.

An invention according to claim 11 is the power supply control method according to claim 10, further comprising: a system series/parallel requirement receiving step of receiving a requirement in relation to the connection mode of the plurality of batteries based on an efficiency of the whole of the vehicle, wherein in the series/parallel requirement determination step, it is determined which is greater in number between a series requirement and a parallel requirement receiving step and the system series/parallel requirement receiving step, and in a case it is determined in the series/parallel requirement determination step that the number of series requirements is equal to the number of parallel requirements, in the series/parallel determination step, it is determined that the connection mode of the plurality of batteries is to be a series mode or a parallel mode according to the requirement received in the system series/parallel requirement receiving step.

An invention according to claim 12 is the power supply control method according to claim 10 or 11, when an output of the device is increased according to a required output for the vehicle in a state that the plurality of batteries are connected in parallel, a switching operation of switching the connection mode from a parallel mode to a series mode is started before the output of the device reaches an output limit value for a state where the connection mode is being switched.

Advantage of the Invention

According to the invention of claim 1, it is possible to control the switching of the connection mode of the batteries between the series mode and the parallel mode according to the states of the battery portion, the motor and the device. Additionally, even in the case the device mounted on the vehicle is changed or a device is added, it is possible to deal with the change or addition appropriately without making a large modification.

According to the inventions of claims 2, 3 and 10, the respective requirements of the battery portion, the motor and the device are outputted together with the degrees of priority thereof, and the determination is made based on the requirement having the highest degree of priority. Therefore, it is possible to perform the control in which the requirement having a higher degree of importance is prioritized.

According to the invention of claim 4, the connection mode of the batteries is determined based on which is greater in number between the series requirement and the parallel requirement in the case the degrees of priority are the same. Therefore, it is possible to perform the control which satisfies the requirements of many of the devices.

According to the inventions of claims 5, 6 and 11, the connection mode of the batteries is determined in consideration of the efficiency of the whole system of the vehicle, too, and therefore, it is possible to enhance the energy efficiency of the whole system of the vehicle, too, and therefore, it is possible to enhance the energy efficiency of the whole of the vehicle.

According to the inventions of claims 7 to 9 and 12, it is possible to obtain the sufficient output from the drive source even while the connection mode of the plurality of batteries is being switched from the parallel mode to the series mode.

According to the inventions of claims 8 to 9, even though the required output is increased at the maximum change rate during the switching, it is possible to obtain the sufficient output from the drive source.

BRIEF DESCRIPTION OF DRAWINGS

FIG. 4 is a chart explaining examples of requirements which are outputted in relation to individual devices.

FIG. 5 is a chart explaining rules by which a connection mode of the battery is determined.

MODE FOR CARRYING OUT THE INVENTION

Hereinafter, embodiments of the invention will be described by reference to the drawings.

An HEV (Hybrid Electrical Vehicle) on which a power supply control apparatus according to the invention includes an motor and an internal combustion engine and is driven by means of a driving force of the motor and/or the internal combustion engine according to the driving conditions of the vehicle. HEVs are divided roughly into two system types; a series system and a parallel system. A series system HEV runs based on power of the motor. The internal combustion engine is used to generate electrical power. The electrical power generated in a generator by means of power of the internal combustion engine is used to charge a battery or supplied to the motor. A parallel system HEV runs based on a driving force of either or both of the motor and the internal combustion engine. A series/parallel system HEV is also known in which both the systems are combined. In the series/parallel system, a clutch is released or applied (disengaged or engaged) according to the driving conditions of the vehicle, whereby a transmission system of driving force is switched to either the series system or the parallel system. In the HEV, in order to obtain a braking force that corresponds to a braking force obtained by an engine brake, regenerative braking is made use of in which the motor is caused to function as a generator while the vehicle is being decelerated.

First Embodiment

Figure 1:
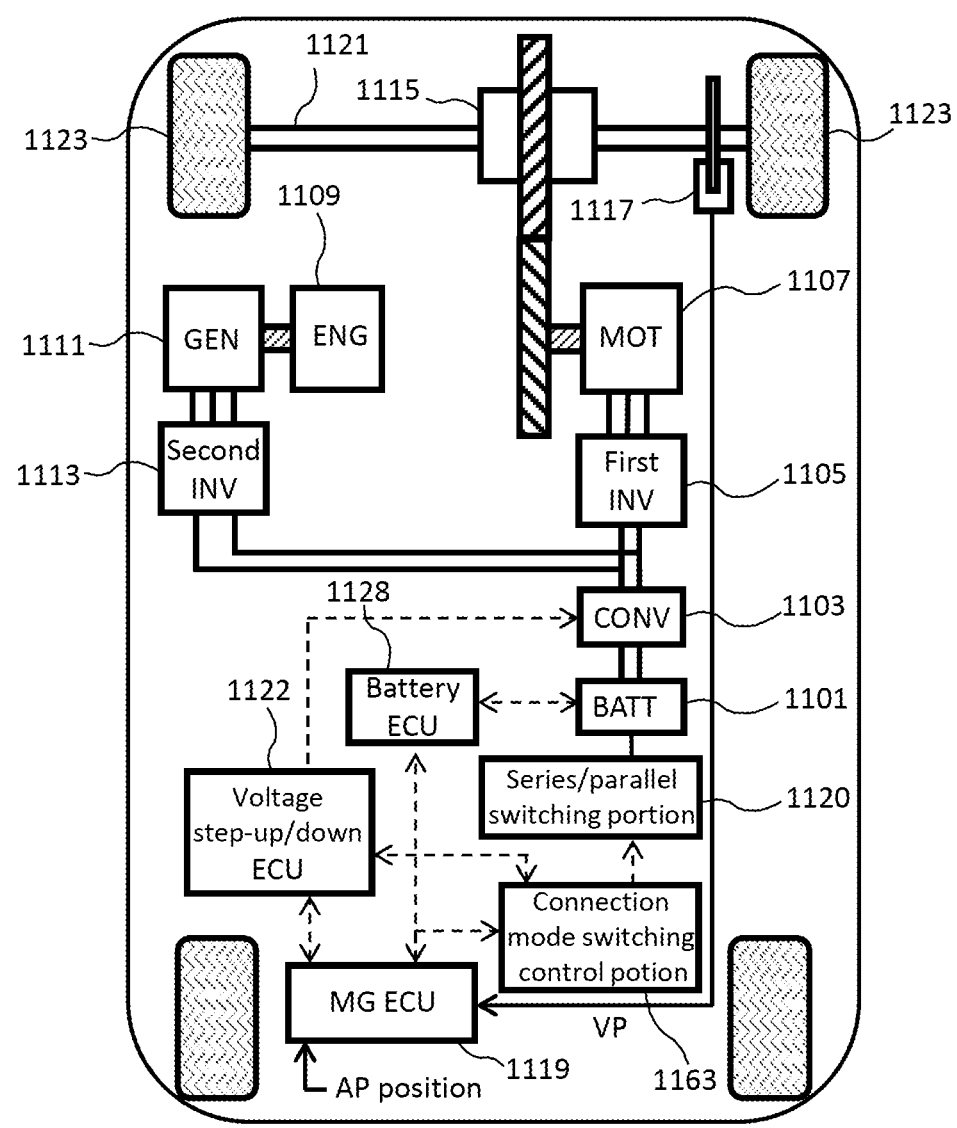
FIG. 1 is a block diagram showing an internal configuration of a series HEV.
Figure 2:
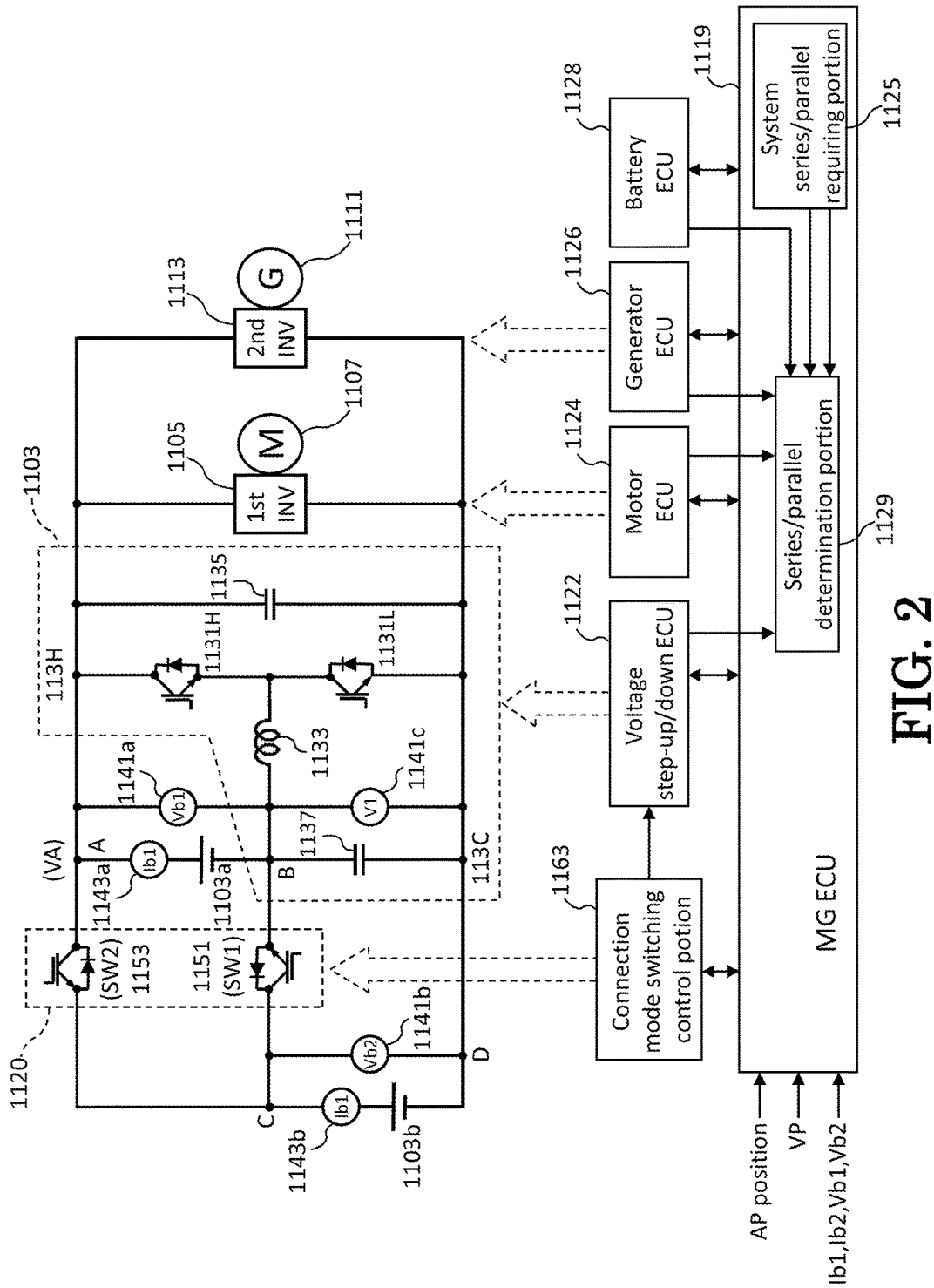
FIG. 2 is a diagram showing a schematic configuration of a drive system of the vehicle shown in FIG. 1 and an internal configuration of a management ECU 1119 of a first embodiment which controls the drive system.

FIG. 1 is a block diagram showing an internal configuration of a series system HEV, and FIG. 2 is a diagram showing a schematic configuration of a drive system of the vehicle shown in FIG. 1 and an internal configuration of a management ECU 1119 of a first embodiment which controls the drive system.

As shown in FIG. 1 or 2, a series system HEV (hereinafter, referred to simply as a "vehicle") includes a battery (BATT) 1101, a converter (CONV) 1103, a first inverter (first INV) 1105, and motor (MOT) 1107, and internal combustion engine (ENG) 1109, a generator (GEN) 1111, a second inverter (second INV) 1113, a gearbox (hereinafter, referred to simply as a "gear") 1115, a vehicle speed sensor 1117, a management ECU (MG ECU) 1119, a voltage step-up/down ECU 1122, an motor ECU 1124, a generator ECU 1126, a battery ECU 1128, a series/parallel switching portion 1120, and a connection mode switching control portion 1163. In FIG. 1, arrows shown by a solid line indicate flows of value data, and arrows shown by a dotted line indicate flows of control signal that signal instructions.

The battery 1101 has a first battery 1103a and a second battery 1103b which are connected in series or in parallel. As shown in FIG. 2, the first battery 1103a is provided between a third node C and a fourth node D. Each battery includes a plurality of battery cells which are lithium ion battery cells or nickel-metal hydride battery cells.

The converter 1103 is, for example, a chopper DC-DC converter and raises a direct-current output voltage of the battery 1101 while allowing it to remain as direct current. As shown in FIG. 2, the converter 1103 has two switching devices (for example, IGBT: Insulated Gate Bipolar mode Transistor) 1131H, 1131L which are connected in series, a reactor 1133, and smoothing capacitors 1135, 1137. A collector of the switching device 1131L is connected to a common terminal 113C. In addition, an emitter of the switching device 1131H is connected to a collector of the switching device 1131L.

A pulse width modulation (PWM) signal is inputted into respective gates of the switching devices 1131H, 1131L from the management ECU 1119. A state in which the switching device 1131H is on and the switching device 1131L is off and a state in which the switching device 1131H is off and the switching device 1131L is on are switched therebetween alternately, whereby the converter 1103 raises an output voltage of the battery 1101.

The first inverter 1105 converts a direct-current voltage into an alternating-current voltage to supply a three-phase current to the motor 1107. The first inverter 1105 also converts an alternating-current voltage which is inputted when regenerative braking is performed in the motor 1107 into a direct-current voltage.

The motor 1107 is transmitted to drive wheels 1123 by way of the gear 1115 and a drive shaft 1121. A rotor of the motor 1107 is directly connected to the gear 1115. The motor 1107 operates as a generator when regenerative braking is performed.

The internal combustion engine 1109 is used to drive the generator 1111. The generator 1111 is driven by the power of the internal combustion engine 1109 to generate electric power. The electric power generated by the generator 1111 is used to charge the battery 1101 or is supplied to the motor 1107 via the second inverter 1113 and the first inverter 1105. The second inverter 1113 converts an alternating-current voltage generated by the generator 111 into a direct-current voltage. The electric power converted by the second inverter 1113 is used to charge the battery 1101 or is supplied to the motor 1107 via the first inverter 1105.

The gear 1115 is a one-speed fixed gear which corresponds, for example, to a fifth gear. Consequently, the gear 1115 converts a driving force from the motor 1107 into a revolution speed and torque at a specific gear ratio and transmits them to the drive shaft 1121. The vehicle speed sensor 1117 detects a driving speed (a vehicle speed VP) of the vehicle. A signal that signals the vehicle speed VP detected by the vehicle speed sensor 1117 is sent to the management ECU 1119. The revolution speed of the motor 1107 may be used in place of the vehicle speed VP.

The management ECU 1119 obtains various pieces of information indicating a vehicle speed VP and an accelerator pedal position (AP position) according to an accelerator pedal operation by the driver of the vehicle. Additionally, the management ECU 1119 derives an output which is required to be outputted from the motor 1107 which constitutes the drive source of the vehicle (hereinafter, referred to as a "required output") based on the vehicle speed VP and the AP position. In addition, the management ECU 1119 monitors the output of the motor 1107.

Further, as shown in FIG. 2, information indicating an electric potential (a voltage Vb1) between the first node A and the second node B which is detected by a voltage sensor 1141a, information indicating an electric potential (a voltage Vb2) between the third node C and the fourth node D which is detected by a voltage sensor 1141b and information indicating an electric potential (a voltage V1) between the second node B and the fourth node D which is detected by a voltage sensor 1141c are inputted into the management ECU 1119. In addition, as shown in FIG. 2, an actual battery current Ib1 which is detected by a current sensor 1143a as a current flowing through the first battery 1103a and an actual battery current Ib2 which is detected by a current sensor 1143b as a current flowing through the second battery 1103b are inputted into the management ECU 1119.

The management ECU 1119 has a system series/parallel requiring portion 1125 and a series/parallel determination portion 1129. The system series/parallel requiring portion 1125 monitors voltages of a vehicle system and derives an energy efficiency of the whole of the system. The series/parallel determination portion 1129 determines that the first battery 1103a and the second battery 1103b of the battery 1101 are to be connected in series or in parallel. Part or the whole of the management ECU 1119 including the series/parallel determination portion 1129 functions as a power supply control apparatus of this embodiment.

The voltage step-up/down ECU 1122 PWM controls the switching devices 1131H, 1131L which make up the converter 1103 by means of a two-phase modulation system. Additionally, the voltage step-up/down ECU 1122 acquires information in relation to the temperature of the reactor 1133. The motor ECU 1124 controls the motor 1107 by PWM controlling switching operations of switching devices which make up the first inverter 1105 by means of a two-phase modulation system. Additionally, the motor ECU 1124 acquires information in relation to the temperature of the first inverter 1105. The motor ECU 1124 controls the motor 1107 so that the motor 1107 executes regenerative braking to obtain a braking force for the vehicle when the vehicle is being decelerated.

The generator ECU 1126 controls the generator 1111 by PWM controlling switching operations of switching devices which make up the second inverter 1113 by means of a two-phase modulation system. The battery ECU 1128 acquires information in relation to residual capacities (SOC: State of Charge) and temperatures of the constituent batteries of the battery 1101.

The series/parallel switching portion 1120 switches a connection mode of the two batteries of the battery 1101 to a series mode or a parallel mode according to an instruction from the connection mode switching control portion 1163. As shown in FIG. 2, the series/parallel switching portion 1120 has a first switched (SW1) 1151 and a second switch (SW2) 1153 which are switching devices made up of IGBTs or the like. The first switch (SW1) 1151 is provided between the second node B and the third node C, and the second switch (SW2) 1153 is provided between the first node A and the third node C. The series/parallel switching portion 1120 switches a connection mode of the first battery 1103a and the second battery 1103b to a series mode of a parallel mode according to a signal from the connection mode switching control portion 1163 which is inputted into respective gates of the first switch (SW1) 1151 and the second switch (SW2) 1153. When the connection mode of the first battery 1103a and the second battery 1103b is switched from the parallel to the series mode, the series/parallel switching portion 1120 switches off both the first switch (SW1) 1152 and the second switch (SW2) 1153 so that the second battery 1103b is cut off from the motor 1107, and the converter 1103 raises the voltage so that the voltage for the motor 1107 increases gradually.

The connection mode switching control portion 1163 controls the switching on or off of the first switch (SW1) 1151 and the second switch (SW2) 1153 which make up the series/parallel switching portion 1120 according to a requirement from the series/parallel determination portion 1129.

In determining on the connection mode of the first battery 1103a and the second battery 1103b of the battery 1101, the series/parallel determination portion 1129 studies which of the series connection and the parallel connection is more suitable based on the state of the whole vehicle system. In addition to this, the series/parallel determination portion 1129 studies which of the series connection and the parallel connection is more suitable based on the state of the battery 1101 alone and the states of the constituent elements including the motor 1107 which gives and is given electric power to and from the battery 1101 (hereinafter, the constituent elements such as the motor 1107 will also be referred to as a "device." Namely, the motor 1107 is an example of the "device."). Hereinafter, referring to FIGS. 3 to 5, a procedure will be described in detail in which the series/parallel determination portion 1129 determines on the connection mode of the first battery 1103a and the second battery 1103b of the battery 1101.

Figure 3:
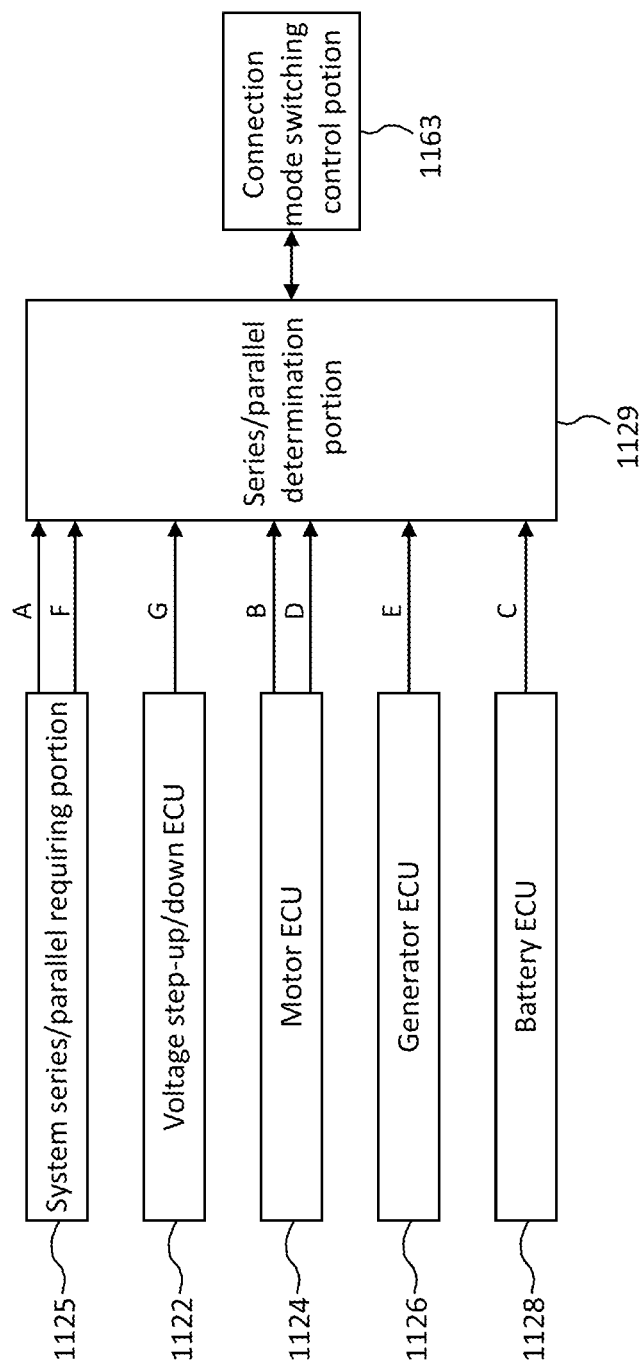
FIG. 3 is a diagram explaining a process of determining a connection mode of a battery.

FIG. 3 is a diagram explaining a process of determining on the connection mode of the first battery 1103a and the second battery 1103b of the battery 1101. As shown in FIG. 3, a series requirement, a parallel requirement or a holding requirement is sent to the series/parallel determination portion 1129 together with a degree of priority thereof from the system series/parallel requiring portion 1125, the voltage step-up/down ECU 1122, the motor ECU 1124, the generator ECU 1126 and the battery ECU 1128.

FIG. 4 is a chart explaining examples of requirements A to G which are outputted in relation to the individual devices. As shown in FIG. 4, anyone of three, high, medium and low degrees of priority is given to the requirements A to G according to a degree of necessity of selecting one from the series requirement, the parallel requirement and the holding requirement. The requirements to which the degree of priority (high) is given are intended to protect the system, the device or a part from deterioration triggered by overload and overheat. The requirements to which the degree of priority (medium) is given are intended to satisfy requirements of the driver (driver requirements) including acceleration and deceleration which are required based on AP position or vehicle speed VP. The requirements to which the degree of priority (low) is given are intended to improve the energy efficiency.

The requirement A is a requirement in relation to the efficiency of the whole system of the vehicle (a system efficiency requirement). The system series/parallel requiring portion 1125 derives an energy efficiency of the whole system of the vehicle including the battery 1101, the internal combustion engine 1109 and all the devices which are mounted on the vehicle, and outputs a series requirement or a parallel requirement based on the results thereof. In this way, the requirement A is intended to improve the energy efficiency and the degree of priority (low) is given thereto. In the case there is caused only a constant difference in the energy efficiency whether the connection mode is the series or parallel mode, the requirement A may not be outputted in order to prevent a frequent occurrence of switching operation.

The requirement B is a requirement in relation to the first inverter 1105. When the load of the motor 1107 is great, a current flows continuously to the switching devices which make up the first inverter 1105, whereby there may be a situation in which the temperature of the first inverter 1105 is raised. The temperature of the first inverter 1105 rises remarkably when the voltage is high. Consequently, for example, in the case the temperature of the first inverter 1105 is raised to become equal to or higher than a predetermine value, the motor ECU 1124 output a parallel requirement so as to prevent the temperature from being raised any further. In this way, the requirement B is intended to protect the first inverter 1105, ad the degree of priority (high) is given thereto.

The requirement C is a requirement in relation to an output limit of the battery 1101. As has been described above, the second battery 1103b is cut off while the connection mode of the battery 1101 is being switched to the series or parallel mode and therefore, a maximum output of the battery 1101 is an output which is obtained only from the first battery 1103a. Therefore, when the connection mode of the battery 1101 is switched from the series mode to the parallel mode or vice versa with the current required output being greater than the output which is obtained only from the first battery 1103a, there may be fears that the first battery 1103a is deteriorated. Consequently, the battery ECU 1128 outputs a holding requirement of a current connection mode so as to prohibit the connection mode switching operation from the series mode to the parallel mode or vice versa. In this way, the requirement C is intended to protect the battery 1101, and the degree of priority (high) is given thereto.

The requirement D is a requirement in relation to securing the output of the motor 1107. An upper limit value of an output which can be outputted from the motor 1107 is lower when the first battery 1103a and the second battery 1103b are connected in parallel than when they are connected in series. Consequently, in the case the required output is so great to exceed a predetermined value, the motor ECU 1124 outputs a series requirement, so that a sufficient output can be obtained from the motor 1107. In this way, the requirement D is intended to satisfy the driver requirement, and the degree of priority (medium) is given thereto.

Similarly, the requirement E is a requirement in relation to securing the output of the generator 1111. In the case the required output is so great to exceed the predetermined value, the generator ECU 1126 outputs a series requirement, so that a sufficient output can be obtained from the generator 1111. In this way, the requirement E is intended to satisfy the driver requirement, and the degree of priority (medium) is given thereto.

The requirement F is a requirement in relation to protection of the system from overvoltage. When the first battery 1103a and the second battery 1103b of the battery 1101 are connected in series, in the case a great regenerative current flows thereinto as a result of deceleration or the like, the voltage of the battery 1101 is raised quickly, resulting in fears that an upper limit value of a voltage which is permissible at an output end is surpassed. As this occurs, the system series/parallel requiring portion 1125 output a parallel requirement so as to restrict the voltage from being raised. Consequently, the requirement F is intended to protect the system including the battery 1101, and the degree of priority (high) is given thereto.

The requirement G is a requirement in relation to the reactor 1133. As has been described above, when the connection mode of the battery is being switched to the series or the parallel mode, the converter 1103 raises or drops the voltage, and as this occurs, the reactor 1133 of the converter 1103 generates heat. A frequent occurrence of switching to the series or the parallel mode results in fears that the reactor 1133 is overheated. Consequently, the voltage step-up/down ECU 1122 outputs a holding requirement of a current connection mode so as to prohibit the switching operation to the series or parallel mode when the temperature of the reactor 1133 becomes equal to or higher than a predetermined value. In this way, the requirement G is intended to protect the reactor 1133, and the degree of priority (high) is given thereto.

The series/parallel determination portion 1129 studies the requirements A to G which are outputted in relation to the whole system, the battery 1101 and the individual devices and determines which of the series and the parallel to be selected as the connection mode of the battery 1101. The requirement C which is outputted from the battery ECU 1128 and the requirement G which is outputted from the voltage step-up/down ECU 1122 are the holding requirement of the current connection mode, and therefore, the requirements are sent to the series/parallel determination portion 1129. Thereafter, the holding requirements are read as a series requirement or a parallel requirement according to the current connection mode which is obtained from the connection mode switching control portion 1163 (a rule "e", which will be described later). The series/parallel determination portion 1129 studies the requirements A to G which are outputted in relation to the whole system, the battery 1101 and the individual devices based on predetermined rules a to d.

FIG. 5 is a chart explaining rules which are used to determine on the connection mode of the battery 1101. As shown in FIG. 5, predetermined priorities are given to the rules "a" to "d" based on which the connection mode of the battery 1101 is determined and are stored in a memory, not shown, in advance. The series/parallel determination portion 1129 applies the rules "a" to "d" according to the priorities given thereto and determines which of the series mode and the parallel mode to be selected as the connection mode of the battery 1101.

The rule "a" has a first priority and rules that the parallel requirement be selected in the case the series requirement (high) and the parallel requirement (high) are both present simultaneously in requirements outputted individually from the whole system, the battery 1101 and the other devices. The requirements with the high degree of priority are all intended to protect the system, the devices or the parts, and therefore, the safety can be ensured by selecting the parallel connection whose voltage is lower than that of the series connection.

The rule "b" has a second priority and rules that the series requirement be selected in the case the series requirement (medium) and the parallel requirement (medium) are both present simultaneously and in the same number in the requirements outputted individually from the whole system, the battery 1101 and the other devices. The requirements with the medium degree of priority are all intended to satisfy the driver requirement, and therefore, the required output can be ensured by selecting the series connection whose voltage is higher than that of the parallel connection.

The rule "c" has also a second priority and rules that in the case the number of parallel requirements is not the same as the number of series requirements in the requirement with the highest priority in the requirements outputted individually from the whole system, the battery 1101 and the other devices, the series requirement or the parallel requirement which is greater in number be adopted. This can satisfy the requirements of more of the devices.

The rule "d" has a third priority and rules that in the case the number of parallel requirements is the same as the number of series requirements in the requirement with the highest priority in the requirements outputted individually from the whole system, the battery 1101 and the other devices, the series requirement or the parallel requirement be selected according to the contents of the requirement in relation to the efficiency of the whole system of the vehicle (the requirement A described above). For example, when two series requirements (low) and two parallel requirements (low) are outputted, in the case the requirement in relation to the system efficiency (the requirement A described above is the parallel requirement (low), the series/parallel determination portion 1129 selects the parallel requirement. The requirements with the low degree of priority are all related to the energy efficiency, and therefore, it is possible to improve the energy efficiency of the whole vehicle by selecting the series or the parallel according to the system efficiency requirement.

The rule "e" shown in FIG. 5 has no priority and rules that the holding requirement be replaced by the series requirement or the parallel requirement. Specifically, in the case the current switching mode is the parallel mode, the holding requirement (high) is replaced by the parallel requirement (high), whereas in the case the current switching mode is the series mode, the holding requirement (high) is replaced by the series requirement (high). As has been described above, the holding requirement (high) is the requirement intended to protect the devices by avoiding the switching operation to the series or parallel while the devices are in a transition state. However, the switching mode is selected between the series mode and the parallel mode, and therefore, the connection switching mode needs to be replaced by either of the series and parallel modes. The series/parallel determination portion 1129 replaces the holding requirement (high) with a requirement which requires the current switching mode to be held.

The series requirement or the parallel requirement which is determined by the series/parallel determination portion 1129 is sent to the connection mode switching control portion 1163. The series/parallel switching portion 1120 can switch the connection mode of the first battery 1103*a* and the second battery 1103*b* based on the series requirement or the parallel require.

Figure 6:
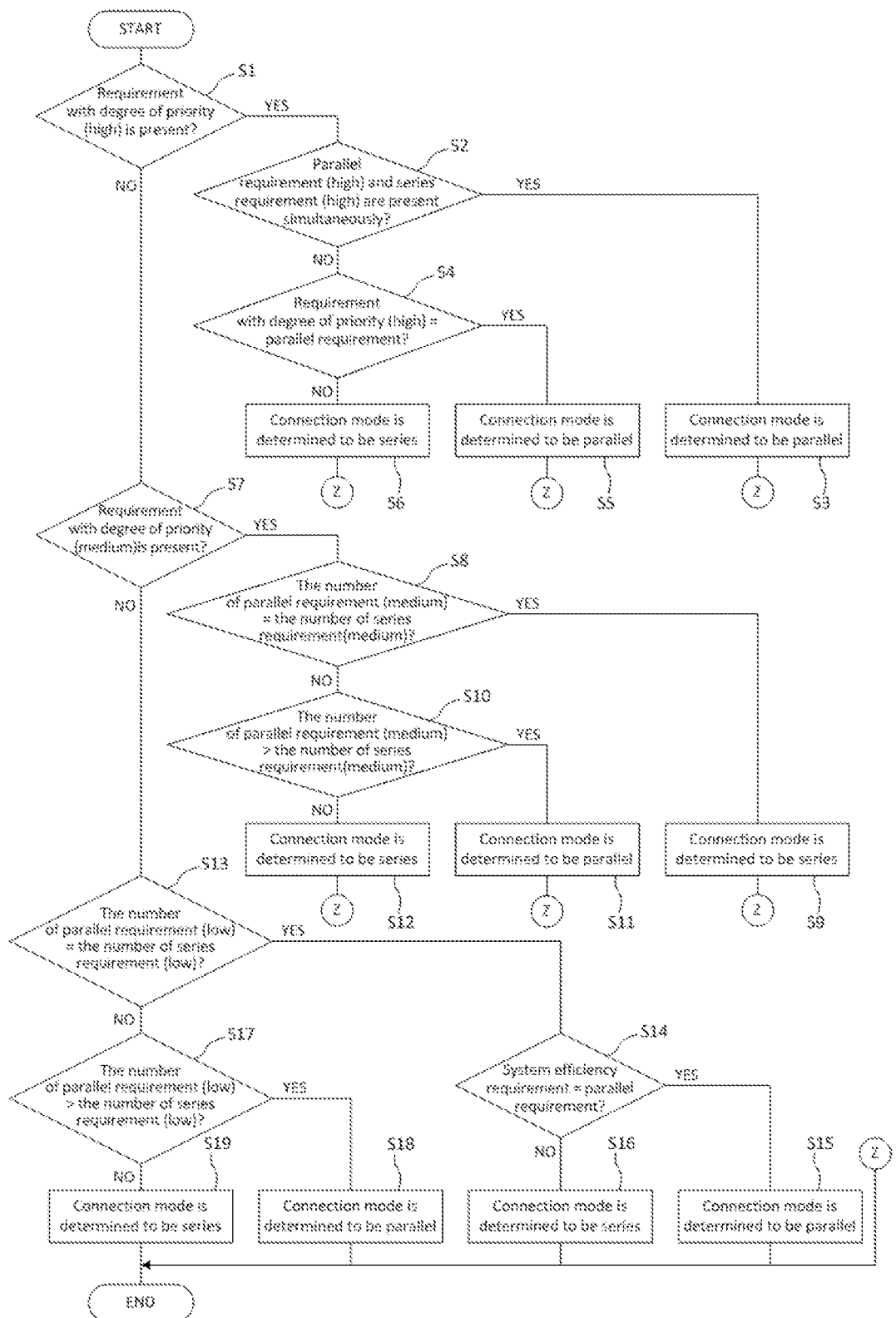
FIG. 6 is a flowchart explaining an operation of a series/parallel determination portion 1129 in the first embodiment.

FIG. 6 is a flowchart explaining the operation of the series/parallel determination portion 1129 in this embodiment. Firstly, the series/parallel determination portion 1129 determines whether or not the holding requirement (high) is present in the requirements in relation to the constituent devices and the whole system which are outputted from the constituent ECUs and the system series/parallel requiring portion 1125. If the series/parallel determination portion 1129 determines that the holding requirement (high) is present, the series/parallel determination portion 1129 replaces the holding requirement (high) with the requirement which requires the current connection mode to be held, and the operation proceeds to step S1. If the holding requirement (high) is determined not to be present, the operation proceeds directly to step S1. Then, the series/parallel determination portion 1129 determines whether or not the requirement with the degree of priority (high) is present in the requirements in relation to the constituent devices and the whole system and the replaced requirement (step S1).

If having determined that the requirement with the priority (high) is present, the series/parallel determination portion 1129 determines whether or not the parallel requirement with the degree of priority (high) and the series requirement with the degree of priority (high) are present simultaneously (step S2). If having determined that the parallel requirement with the degree of priority (high) and the series requirement with the degree of priority (high) are present, the series/parallel determination portion 1129 determines that the connection mode of the first battery 1103*a* and the second battery 1103*b* be the parallel mode according to the rule "a" described above (step S3).

If having determined that the parallel requirement with the degree of priority (high) and the series requirement with the degree of priority (high) are not present simultaneously in step S2, the series/parallel determination portion 1129 determines whether or not the requirement with the degree of priority (high) is the parallel requirement (step S4). If having determined that the requirement with the degree of priority (high) is the parallel requirement, that is, if the requirements with the degree of priority (high) are only the parallel requirements, the series/parallel determination portion 1129 determines that the connection mode of the first battery 1103*a* and the second battery 1103*b* be the parallel mode (step S5). On the contrary, if having determined that the requirement with the degree of priority (high) is not the parallel requirement in step S4, that is, if the requirements with the degree of priority (high) are only the series requirements, the series/parallel determination portion 1129 determines that the connection mode of the first battery 1103*a* and the second battery 1103*b* be the series mode (step S6).

If having determined that the requirement with the degree of priority (high) is not present in step S1, the series/parallel determination portion 1120 determines whether or not the requirement with the degree of priority (medium is present (step S7). If having determined that the requirement with the priority (medium) is present, the series/parallel determination portion 1129 determines whether or not the number of parallel requirements with the degree of priority (medium) is equal to the number of series requirements with the degree of priority (medium) step S8). If having determined that the number of parallel requirements with the degree of priority (medium) is equal to the number of series requirements with the degree of priority (medium), the series/parallel determination portion 1129 determines that the connection mode of the first battery 1103*a* and the second battery 1103*b* be the series mode according to the rule "b" described above (step S9).

If having determined that the number of parallel requirements with the degree of priority (medium) is not equal to the number of series requirements with the degree of priority (medium) in step S8, the series/parallel determination portion 1129 determines whether or not the number of parallel requirements with the degree of priority (medium) is greater than the number of series requirements with the degree of priority (medium) (step S10). If having determined that the number of parallel requirements with the degree of priority (medium) is greater than the number of series requirements with the degree of priority (medium), the series/parallel determination portion 1129 determines that the connection mode of the first battery 1103*a* and the second battery 1103*b* be the parallel mode according to the rule "c" described above (step S11). On the contrary, if having determined that the number of parallel requirements with the degree of priority (medium) is smaller than the number of series requirements with the degree of priority (medium) in step S10, the series/parallel determination portion 1129 determines that the connection mode of the first battery 1103*a* and the second battery 1103*b* be the series mode according to the rule "c" described above (step S12).

If having determined that the requirement with the priority (medium) is not present in step S7, the series/parallel determination portion 1129 determines whether or not the number of parallel requirements with the degree of priority (low) is equal to the number of series requirements with the degree of priority (low) (step S13). If having determined that the number of parallel requirements with the degree of priority (low) is equal to the number of series requirements with the degree of priority (low), the series/parallel determination portion 1129 determines whether or not a system efficiency requirement which is outputted from the system series/parallel requiring portion 1125 is a parallel requirement (step S14). If having determined in step S13 that the system efficiency requirement is the parallel requirement, the series/parallel determination portion 1129 determines according the rule "d" described above that the connection mode of the first battery 1103*a* and the second battery 1103*b* be the parallel mode (step S15), if having determined in step S13 that the system efficiency requirement is the series requirement, the series/parallel determination portion 1129 determines according the rule "d" described above that the connection mode of the first battery 1103*a* and the second battery 1103*b* be the series mode (step S16).

If having determined in step S13 that the number of parallel requirements with the degree of priority (low) is not equal to the number of series requirements with the degree of priority (low), the series/parallel determination portion 1129 determines whether or not the number of parallel requirements with the degree of priority (low) is greater than the number of series requirements with the degree of priority (low) (step S17). If having determined that the number of parallel requirements with the degree of priority (low) is greater than the number of series requirements with the degree of priority (low), the series/parallel determination portion 1129 determines according to the rule "c" described above that the connection mode of the first battery 1103a and the second battery 1103b be the parallel mode (step S18). On the contrary, if having determined in step S10 that the number of parallel requirements with the degree of priority (low) is smaller than the number of series requirements with the degree of priority (low, the series/parallel determination portion 1129 determines that the connection mode of the first battery 1103a and the second battery 1103b be the series mode according to the rule "c" described above (step S19).

In this way, according to the power supply control apparatus and the power supply control method of this embodiment, it is possible not only to control the switching of the connection mode of the battery 1101 between the series mode and the parallel mode according to the states of the battery 1101 and the constituent devices but also to deal with a change or addition to the devices mounted on the vehicle appropriately without making a large modification even in the case the change or addition actually occurs. In addition, the respective requirements of the battery 1101 and the other constituent devices are outputted together with degrees of priority thereof and the determination is made based on the requirement with the highest degree of priority. Therefore, it is possible to execute the control in which the requirement with high importance is prioritized. Additionally, the connection mode of the battery 1101 is determined based on which of the series requirement and the parallels requirement is greater in number in the case the degrees of priority of the series requirement and the parallel requirement are the same. Therefore, it is possible to perform the control which satisfies the requirements of many of the devices. In addition, the connection mode of the battery 1101 is also determined in consideration of the efficiency of the whole system of the vehicle, and therefore, it is possible to improve the energy efficiency of the whole vehicle.

The invention is not limited to the embodiment which has been described heretofore and hence can be modified or improved as required. In the embodiment, while the invention is described as being applied to the series system HEV, the invention can also be applied to a series/parallel system HEV. In addition to the HEVs, the invention may also be applied to EVs (Electric Vehicles) which do not include the internal combustion engine 1109. Further, the number of batteries which make up the battery 1101 and which can be connected in series and in parallel is not limited to two, and hence, the number of such batteries may be three or more. The number of degrees of priority in relation to the connection mode of the battery 1101 is not limited to the three of high, medium and low, and hence, the number of degrees of priority may be two or four or more. Additionally, an addition and/or change can be made to the contents of the devices and the contents of the requirements.

Second Embodiment

<What Brings about Second Embodiment>

Figure 14A:
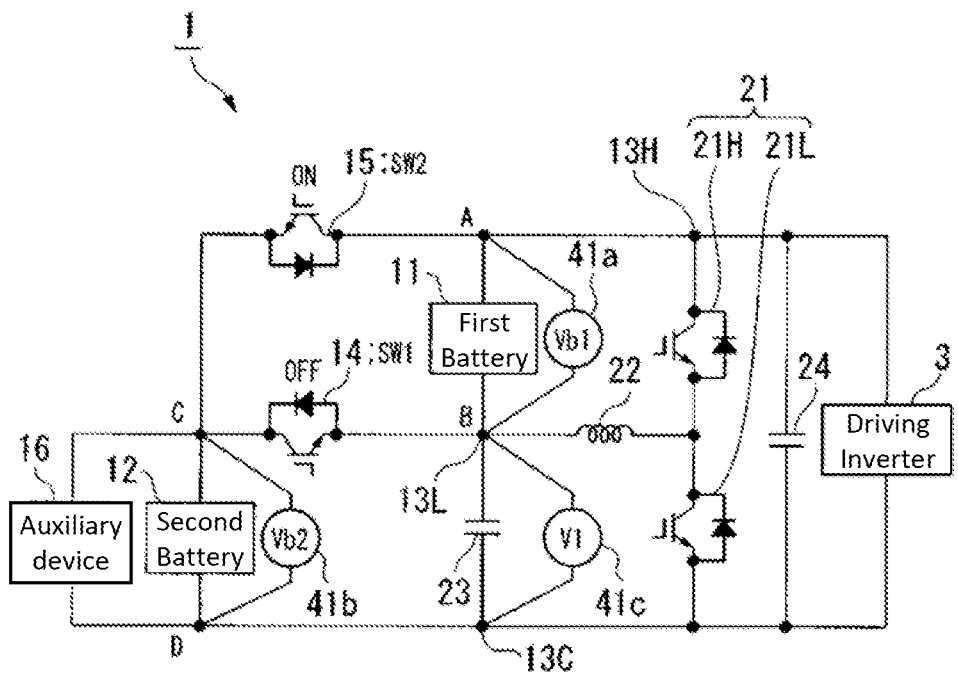
FIG. 14A is a diagram showing a state in which a first battery and a secondary battery are connected in parallel with respect to a driving inverter of an motor (M) in the electric vehicle power supply apparatus in FIG. 13.
Figure 14B:
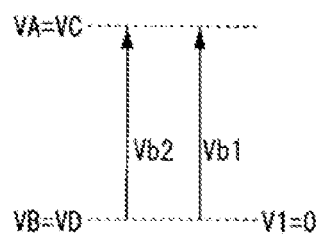
FIG. 14B is a diagram showing respective electric potentials of nodes when a regeneration is performed in such a state that the first and second batteries are connected in parallel.
Figure 15A:
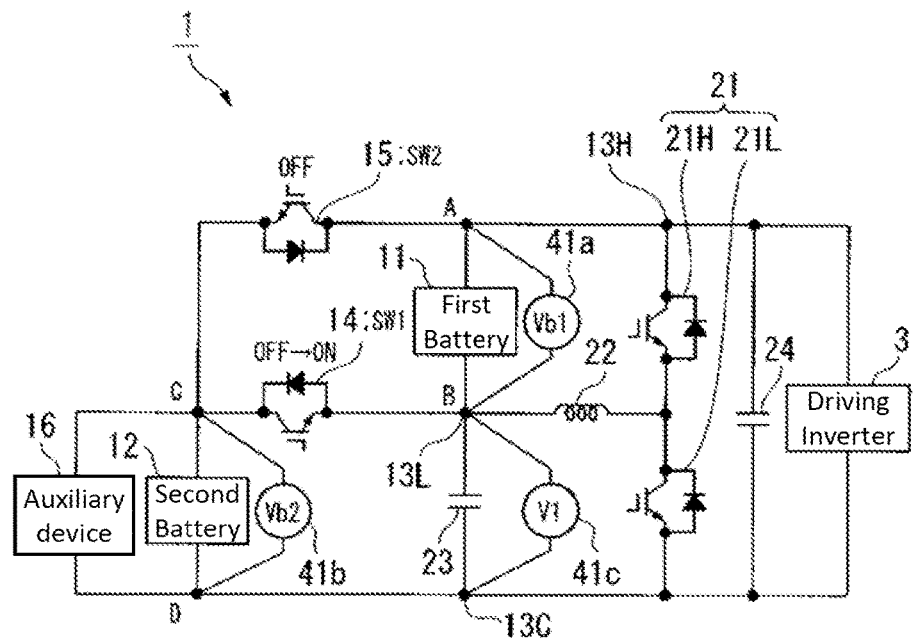
FIG. 15A is a diagram showing a state in which the first battery and the secondary battery are connected in series with respect to the driving inverter of the motor (M) in the electric vehicle power supply apparatus in FIG. 13.
Figure 15B:
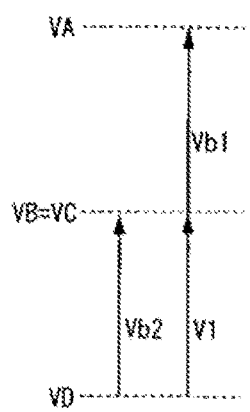
FIG. 15B is a diagram showing respective electric potentials of nodes when a regeneration is performed in such a state that the first and second batteries are connected in series.

In the electric vehicle power supply apparatus 1 of patent literature 1 described above, in a state shown in FIG. 14A in which the first battery 11 and the second battery 12 are connected in parallel, a voltage applied to the driving inverter 3 is a constant voltage which is the voltage (the first battery voltage) Vb1 of the first battery 11 or the voltage (the second battery voltage) Vb2 of the second battery 12, as shown in FIG. 14B. On the other hand, in a state shown in FIG. 15A in which the first battery 11 and the second battery 12 are connected in series, a voltage applied to the driving inverter 3 is a constant voltage which takes a value resulting from adding the voltage (the first battery voltage) Vb1 of the first battery 11 to the voltage (the second battery voltage) Vb2 of the second battery 12, as shown in FIG. 15B. In this way, although the voltages applied to the driving inverter 3 takes the constant values both the battery is connected in parallels and in series, the output of the motor (M) 2 changes as a result of an motor control portion 33 of a control apparatus 17 controlling the electric power converting operation of the driving inverter 3.

Figure 13:
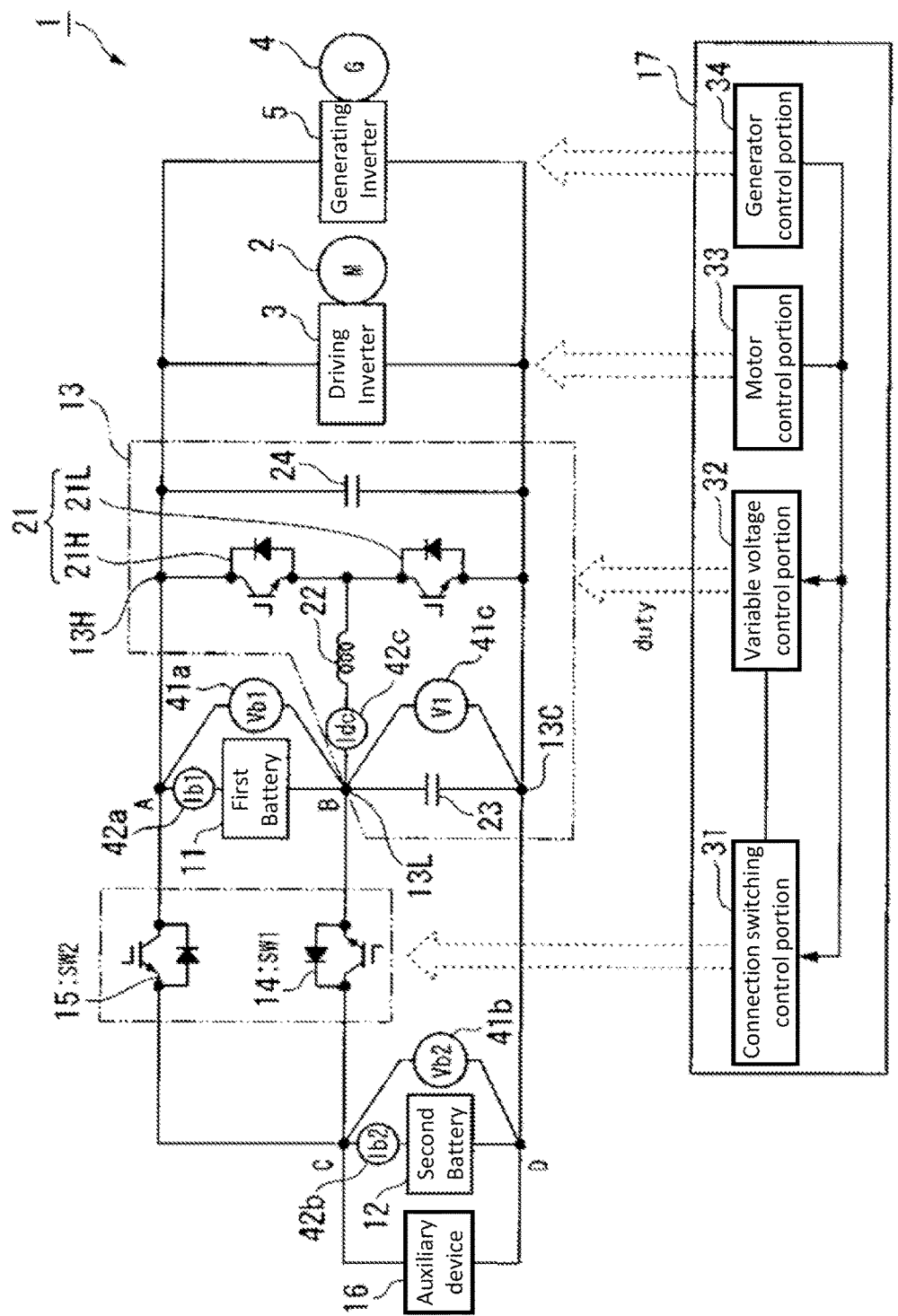
FIG. 13 is a block diagram of an electric vehicle power supply apparatus which is disclosed in patent literature 1.
Figure 16:
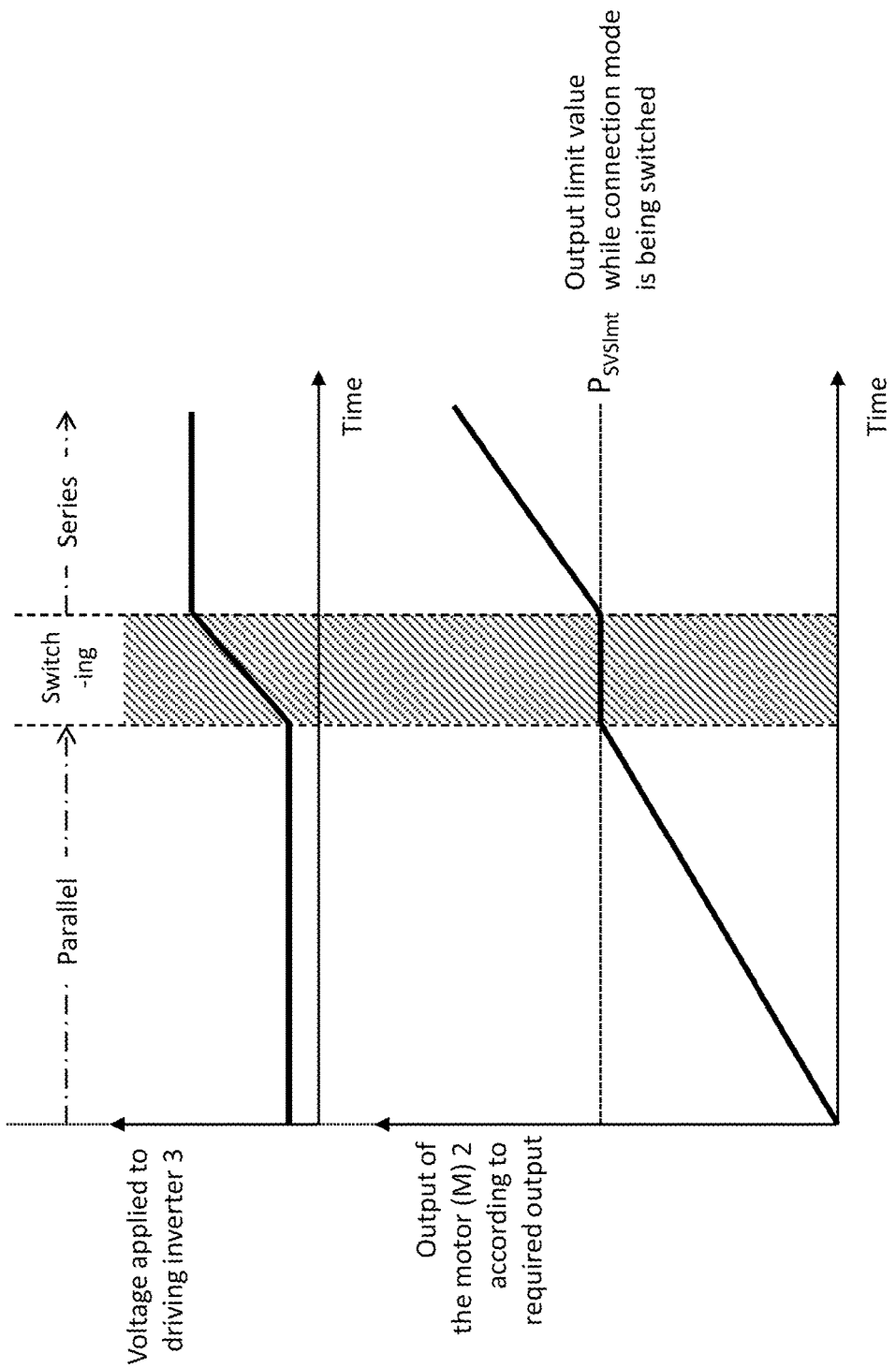
FIG. 16 is a diagram showing an example of a change in voltage applied to the driving inverter and an example of a change in output of the motor (M) when a required output increases constantly on an electric vehicle on which the electric vehicle power supply apparatus shown in FIG. 13 is mounted.

FIG. 16 is a diagram showing an example of a change in voltage applied to the driving inverter 3 and an example of a change in output of the motor (M) 2 when a required output increases constantly on an electric vehicle on which the electric vehicle power supply apparatus 1 shown in FIG. 13 is mounted. As shown in FIG. 16, with the connection mode of the first battery 11 and the second battery 12 (hereinafter, referred to simply as the "connection mode") being the parallel mode, when the output of the motor (M) 2 rises according to the increase in the required output to reach an output limit value $P_{SVSlmt}$ for a switching mode which is neither the parallel mode nor the series mode, a connection switching control portion 31 of the control apparatus 17 opens (off) the second switch (SW2) 15 while keeping the first switch (SW1) 14 open (off) shown in FIG. 13 so as to switch the connection mode from the parallel to the series mode. This state is a state where the second battery 12 is cut off from the driving inverter 3 and constitutes the switching mode which is neither the parallel mode nor the series mode. The output limit value $P_{SVSlmt}$ is a value which is preset according to the capacity of the first battery 11.

Thereafter, a variable voltage control portion 32 of the control apparatus 17 causes the DC-DC converter 13 to continue to perform the voltage raising operation until the electric potential VB at the second node B and the electric potential VC at the third node C shown in FIG. 13 become equal to each other. When the electric potential VB at the second node B becomes equal to the electric potential VC at the third note C, the variable voltage control portion 32 stops the voltage raising operation of the DC-DC converter 13, and the connection switching control portion 31 closes (on) the first switch (SW1) 14 while keeping the second switch (SW2) 15 open (off). In this way, the connection mode of the first battery 11 and the second battery 12 is switched from the parallel mode to the series mode by way of the switching mode.

In FIG. 16, a period of time shaded with slant lines is shown as a switching period from the parallel connection to the series connection. Even though the required output continues to increase even in the switching period, as shown in FIG. 16, the output of the motor (M) 2 is limited to the limit value $P_{SVSlmt}$ by the control of the motor control portion 33. In this way, when the connection mode between the first battery 11 and the second battery 12 is switched from the parallel mode to the series mode, there may be a case where the drivability is reduced because a sufficient output according to the require output cannot be obtained from the motor (M) 2 during the switching period.

<Description of Second Embodiment>

In the second embodiment, a power supply control apparatus and a series/parallel switching control method by which a sufficient output can also be obtained from a drive source even during a switching period when a connection mode of a plurality of batteries is switched from a parallel mode to a series mode.

Figure 7:
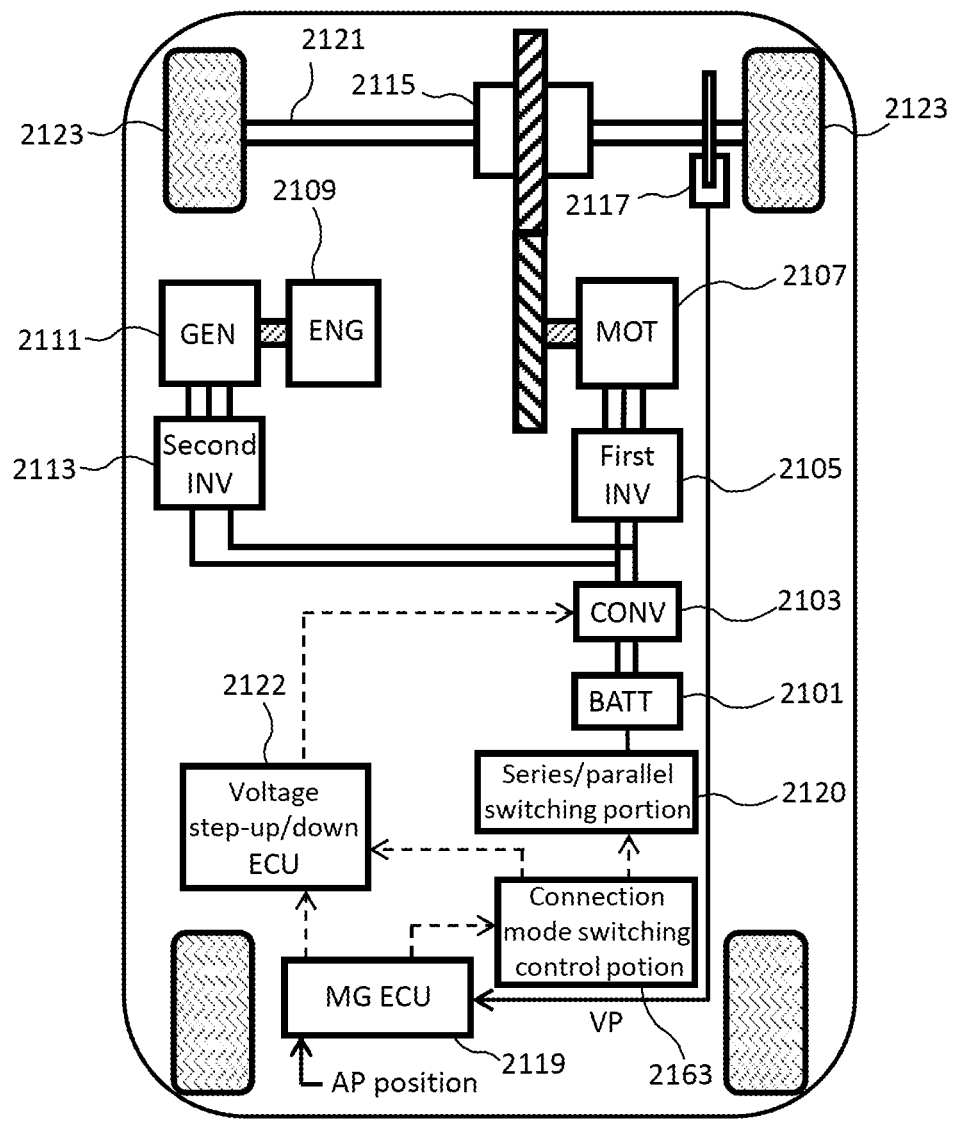
FIG. 7 is a block diagram showing an internal configuration of a series HEV.
Figure 8:
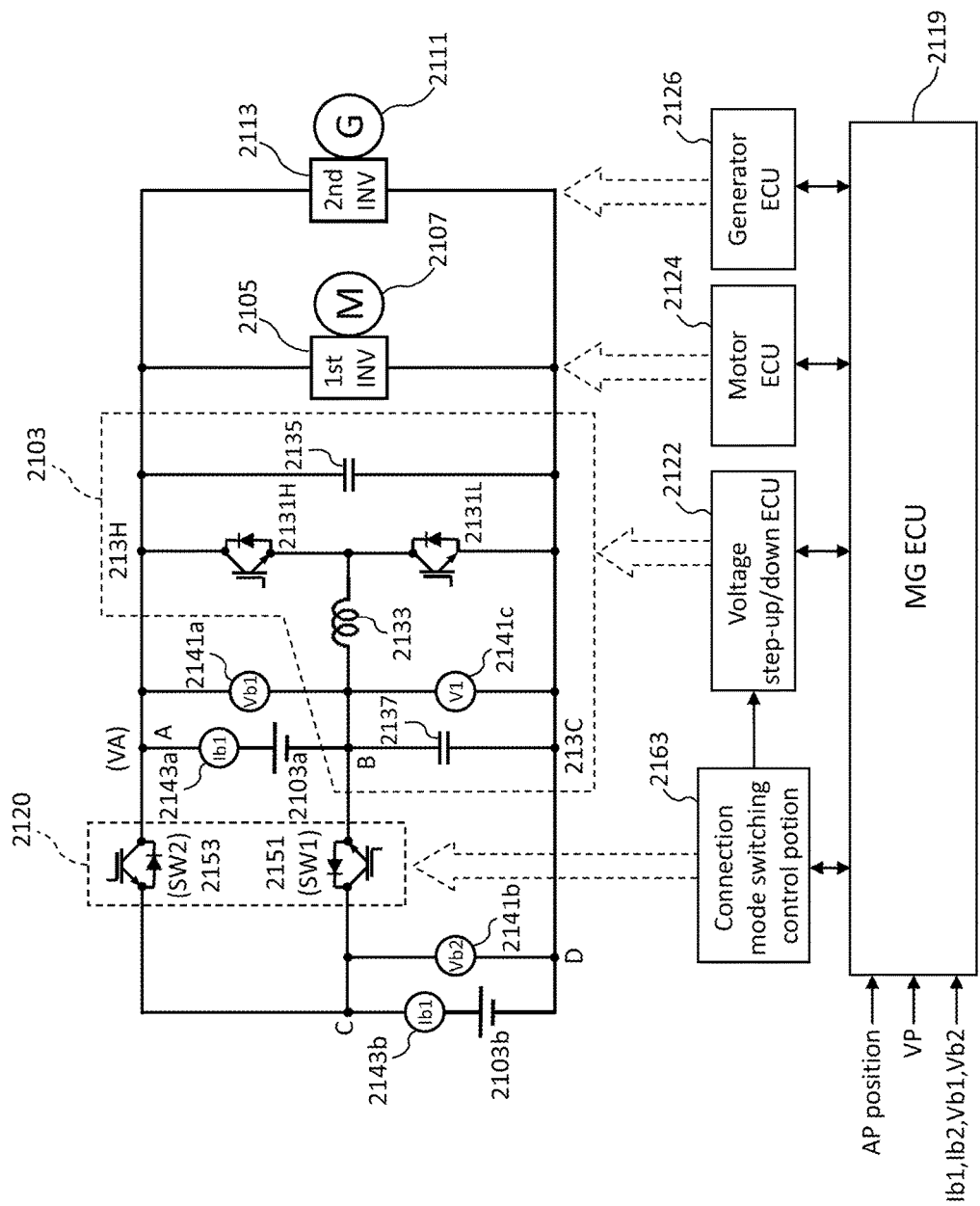
FIG. 8 is a diagram showing a schematic configuration of a drive system of the vehicle shown in FIG. 7.

FIG. 7 is a block diagram showing an internal configuration of a series system HEV. FIG. 8 is a diagram showing a schematic configuration of a drive system of the vehicle shown in FIG. 7.

As shown in FIG. 7 or 8, a series system HEV (hereinafter, referred to simply as a "vehicle") includes a battery (BATT) 2101, a converter (CONV) 2103, a first inverter (first INV) 2105, an motor (MOT) 2107, an internal combustion engine (ENG) 2109, a generator (GEN) 2111, a second inverter (second INV) 2113, a gearbox (hereinafter, referred to simply as a "gear") 2115, a vehicle speed sensor 2117, a management ECU (MG ECU) 2119, a voltage step-up/down ECU 2122, an motor ECU 2124, a generator ECU 2126, a battery ECU 2128, not shown, a series/parallel switching portion 2120, and a connection mode switching control portion 2163. In FIG. 7, arrows shown by a solid line indicate flows of value data, and arrows shown by a dotted line indicate flows of control signal that signal instructions.

The battery 2101 has a first battery 2103a and a second battery 2103b which are connected in series or in parallel. As shown in FIG. 8, the first battery 2103a is provided between a first node A and a second node B, and the second battery 2103b is provided between a third node C and a fourth node D. Each battery includes a plurality of battery cells which are lithium ion battery cells or nickel-metal hydride battery cells.

The converter 2103 is, for example, a chopper DC-DC converter and raises a direct-current output voltage of the battery 2101 while allowing it to remain as direct current. As shown in FIG. 8, the converter 2103 has two switching devices (for example, IGBT: Insulated Gate Bipolar Mode Transistor) 2131H, 2131L which are connected in series, a reactor 2133, and smoothing capacitors 2135, 2137. A collector of the switching device 2131H is connected to a high-voltage side terminal 213H, and an emitter of the switching device 2131L is connected to a common terminal 213C. In addition, an emitter of the switching device 2131H is connected to a collector of the switching device 2131L.

A pulse width modulation (PWM) signal is inputted into respective gates of the switching devices 2131H, 2131L from the management ECU 2119. A state in which the switching device 2131H is off and the switching device 2131L is off and a state in which the switching device 2131H is off and the switching device 2131L is on are switched therebetween alternately, whereby the converter 2103 raises an output voltage of the battery 2101.

The first inverter 2105 converts a direct-current voltage into an alternating-current voltage to supply a three-phase current to the motor 2107. The first inverter 2105 also converts an alternating-current voltage that is inputted when a regenerative braking is performed in the motor 2107 into a direct-current voltage.

The motor 2107 generates power by means of which the vehicle is driven. Torque generated in the motor 2107 is transmitted to drive wheels 2123 by way of the gear 2115 and a drive shaft 2121. A rotor of the motor 2107 is directly connected to the gear 2115. The motor 2107 operates as a generator when regenerative braking is performed.

The internal combustion engine 2109 is used to drive the generator 2111. The generator 2111 is driven by the power of the internal combustion engine 2109 to generate electric power. The electric power generated by the generator 2111 is used to charge the battery 2101 or is supplied to the motor 2107 via the second inverter 2113 and the first inverter 2105. The second inverter 2113 converts an alternating-current voltage generated by the generator 2111 into a direct-current voltage. The electric power converted by the second inverter 2113 is used to charge the battery 2101 or is supplied to the motor 2107 via the first inverter 2105.

The gear 2115 is a one-speed fixed gear that corresponds, for example, to a fifth gear. Consequently, the gear 2115 converts a driving force from the motor 2107 into a revolution speed and torque at a specific gear ratio and transmits them to the drive shaft 2121. The vehicle speed sensor 2117 detects a driving speed (a vehicle speed VP) of the vehicle. A signal that signals the vehicle speed VP detected by the vehicle speed sensor 2117 is sent to the management ECU 2119. The revolution speed of the motor 2107 may be used in place of the vehicle speed VP.

The management ECU 2119 obtains various pieces of information indicating a vehicle speed VP and an accelerator pedal position (AP position) according to an accelerator pedal operation by the driver of the vehicle. Additionally, the management ECU 2119 derives an output which is required to be outputted from the motor 2107 which constitutes the drive source of the vehicle (hereinafter, referred to as a "required output") based on the vehicle speed VP and the AP position. In addition, the management ECU 2119 monitors the output of the motor 2107.

Further, as shown in FIG. 8, information indicating an electric potential (a voltage Vb1) between the first note A and the second node B which is detected by a voltage sensor 2141a, information indicating an electric potential (a voltage Vb2) between the third node C and the fourth node D which is detected by a voltage sensor 2141b and information indicating an electric potential (a voltage V1) between the second node B and the fourth node D which is detected by a voltage sensor 2141c are inputted into the management ECU 2119. In addition, as shown in FIG. 8, an actual battery current Ib1 which is detected by a current sensor 2143a as a current flowing through the first battery 2103a and an actual battery current Ib2 which is detected by a current sensor 2143b as a current flowing through the second battery 2103b are inputted into the management ECU 2119.

The voltage step-up/down ECU 2122 PWM controls the switching devices 2131H, 2131L which make up the converter 2103 by means of a two-phase modulation system. The motor ECU 2124 controls the motor 2107 by PWM controlling switching operations of switching devices which make up the first inverter 2105 by means of a two-phase modulation system. The motor ECU 2124 controls the motor 2107 so that the motor 2107 executes regenerative braking to obtain a braking force for the vehicle when the vehicle is being decelerated.

The generator ECU 2126 controls the generator 2111 by PWM controlling switching operations of switching devices which make up the second inverter 2113 by means of a two-phase modulation system. The battery ECU 2128 acquires information in relation to residual capacities (SOC: State of Charge) and temperatures of the constituent batteries of the battery 2101.

The series/parallel switching portion 2120 switches the connection mode of the two batteries of the battery 2101 to a series mode, a parallel mode and a connection mode which is neither the series mode nor the parallel mode (hereinafter, referred to simply as a "switching state") according to and instruction from the connection mode switching control portion 2163. As shown in FIG. 8, the series/parallel switching portion 2120 has a first switch (SW1) 2151 and a second switch (SW2) 2153 which are switching devices made up of IGBTs or the like. The first switch (SW1) 2151 is provided between the second node B and the third node C, and the second switch (SW2) 2153 is provided between the first node A and the third node C. The series/parallel switching portion 2120 switches the connection mode of the first battery 2103a and the second battery 2103b to anyone of the series mode, the parallel mode and the switching state according to a signal from the connection mode switching control portion 2163 which is inputted into respective gates of the first switch (SW1) 2151 and the second switch (SW2) 2153. When the connection mode of the first battery 2103a and the second battery 2103b is switched from the parallel to the series mode, the series/parallel switching portion 2120 opens (off) both the first switch (SW1) 2151 and the second switch (SW2) 2153 so that the second battery 2103b is cut off from the motor 2107, and the converter 2103 raises the voltage so that the voltage for the motor 2107 increases gradually.

The connection mode switching control portion 2163 controls the switching on or off of the first switch (SW1) 2151 and the second switch (SW2) 2153 which make up the series/parallel switching portion 2120.

Figure 9:
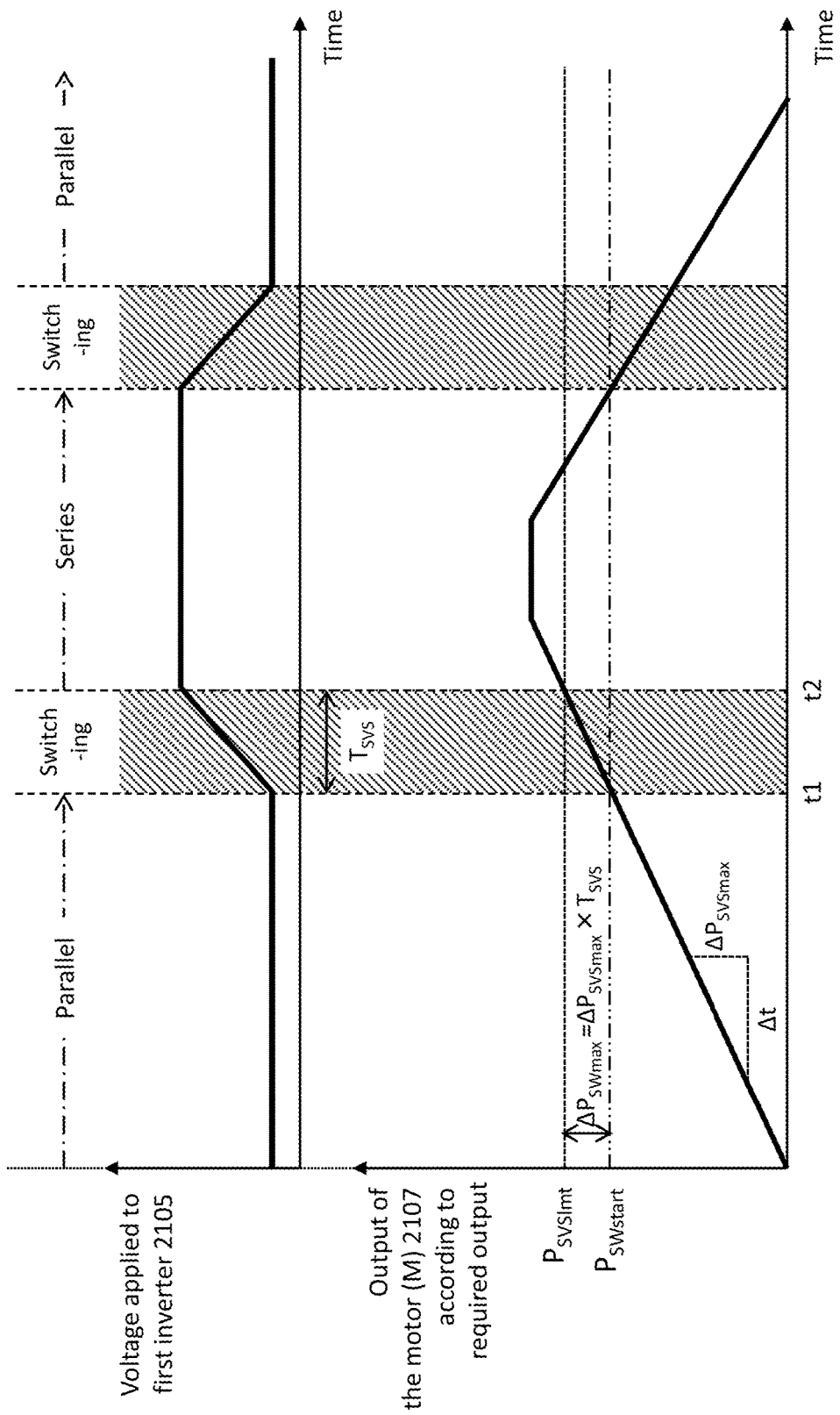
FIG. 9 is a diagram showing an example of a change in voltage applied to a first inverter 2105 and an example of a change in output of an motor (M) 2107, including a state in which a rate at which a required output changes to increase is maximum with an accelerator pedal depressed to a maximum extent by a driver of the vehicle.
Figure 10:
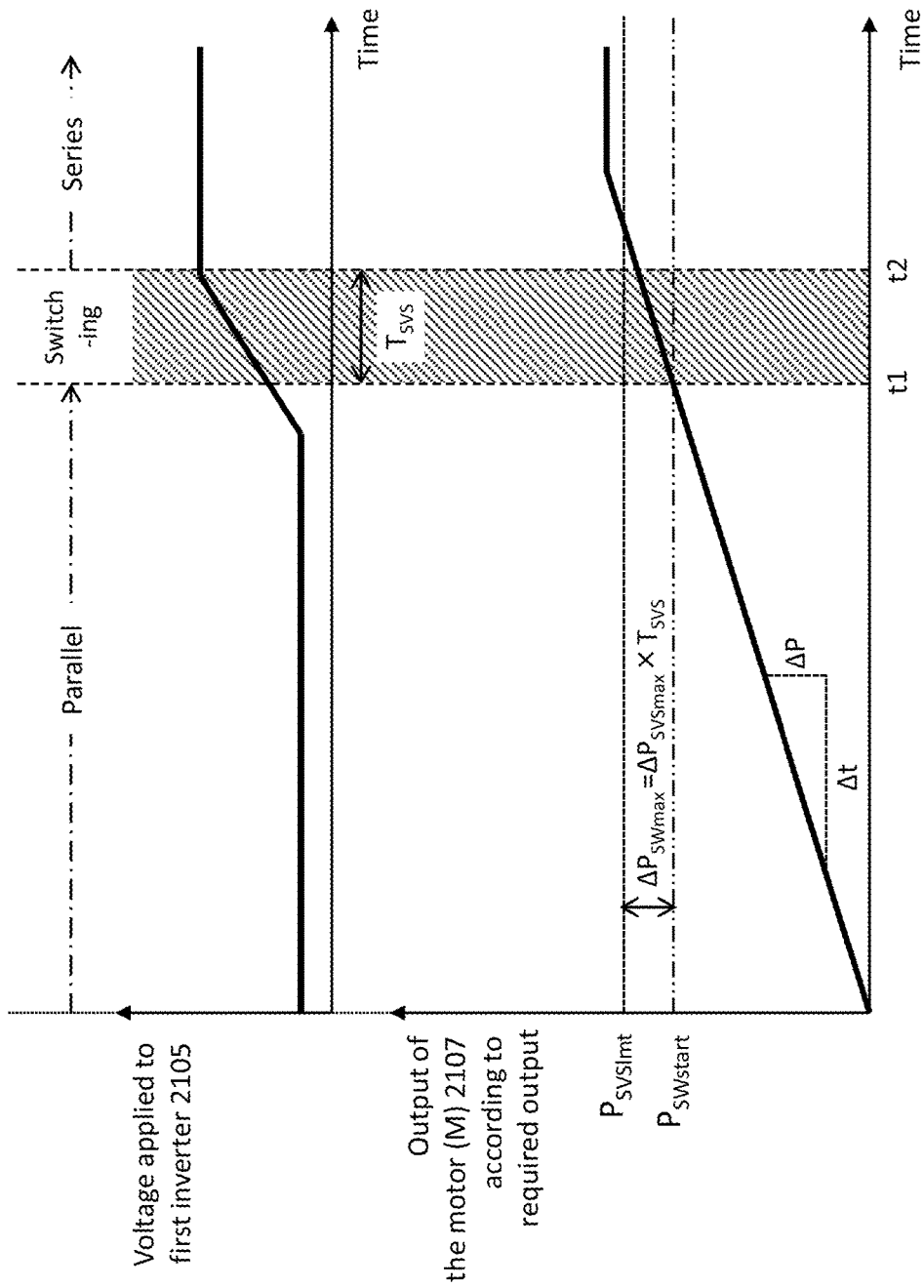
FIG. 10 is a diagram showing an example of a change in voltage applied to the first inverter 2105 and an example of a change in output of the motor (M) 2107, including a state in which a rate at which a required output changes to increase is not maximum although the accelerator pedal is depressed by the driver of the vehicle.

Hereinafter, the control of the series/parallel switching portion 2120 by the connection mode switching control portion 2163 will be described in detail by reference to FIGS. 9 and 10. FIG. 9 is a diagram showing an example of a change in voltage applied to the first inverter 2105 and an example of a change in output of the motor (M) 2107, including a state in which a rate at which a required output changes to increase is maximum with the accelerator pedal depressed to a maximum extent by the driver of the vehicle. FIG. 10 is a diagram showing an example of a change in voltage applied to the first inverter 2105 and an example of a change in output of the motor (M) 2107, including a state in which a rate at which a required output changes to increase is not maximum although the accelerator pedal is depressed by the driver of the vehicle.

As shown in FIG. 9, when the connection mode of the first battery 2103a and the second battery 2103b (hereinafter, referred to simply as the "connection mode") is the parallel mode and a required output which is derived by the management ECU 2119 is increasing at a maximum changing rate, the output of the motor 2107 reaches a switching operation starting output value $P_{SWstart}$, the connection mode switching control portion 2163 opens (off) the second switch (SW2) 2153 while keeping the first switch (SW1) 2151 of the series/parallel switching portion 2120 shown in FIG. 8 open (off) so as to switch the connection mode from the parallel to the series mode. In FIG. 9, a timing at which the second switch (SW2) 2153 is opened (off) is shown as a time t1.

The switching operation starting output value PSWstart is a value resulting from subtracting $\Delta P_{SWmax}$ shown in FIG. 9 from an output limit value $P_{SVSlmt}$ in the switching state which is preset according to the capacity of the first battery 211 ($P_{SWstart}=P_{SVSlmt}-\Delta P_{SWmax}$). $\Delta P_{SWmax}$ shown in FIG. 9 is an integrated value ($\Delta P_{SWmax}=\Delta P_{SVSmax} \times T_{SVS}$) of a maximum value $\Delta P_{SVSmax}$ of a variation per unit time of the required output and a time required for the connection mode to be switched from the parallel to the series mode (hereinafter, referred to as a "switching time") $T_{SVS}$, and is a maximum value of a variation in the required output during the switching time. The maximum value $\Delta P_{SVSmax}$ of the variation per unit time of the required output is a variation per unit time of the required output when the accelerator pedal is depressed to a maximum extent by the driver of the vehicle and is a fixed value which is preset in the connection mode switching control portion 2163. In addition, the switching time $T_{SVS}$ is also a fixed value which is preset in the connection mode switching control portion 2163.

When the switching time $T_{SVS}$ is over as a result of the connection mode being shifted from the parallel mode to the switching state, the connection mode switching control portion 2163 closes (on) the first switch (SW1) 2151 while keeping the second switch (SW2) 2153 of the series/parallel switching portion 2120 open (off). In FIG. 9, a timing at which the first switch (SW1) 2151 is closed (on) is shown as a time t2.

In this way, in this embodiment, the connection mode is shifted from the parallel mode to the switching state at the point in time (t1) at which the output of the motor 2107 reaches the switching operation starting output value $P_{SWstart}$, and therefore, even though the required output increases thereafter at the maximum changing rate, there is caused no such situation that the output of the motor 2107 exceeds the output limit value $P_{SVSlmt}$ during the switching state. For example, as shown in FIG. 10, the output of the motor 2107 until the connection mode is switched to the series mode remains at or below the output limit value $P_{SVSlmt}$ even though the output of the motor 2107 changes according to the required output. Moreover, the connection mode has already been switched to the series mode by the time when the output of the motor 2107 reaches the output limit value $P_{SVSlmt}$.

Figure 11:
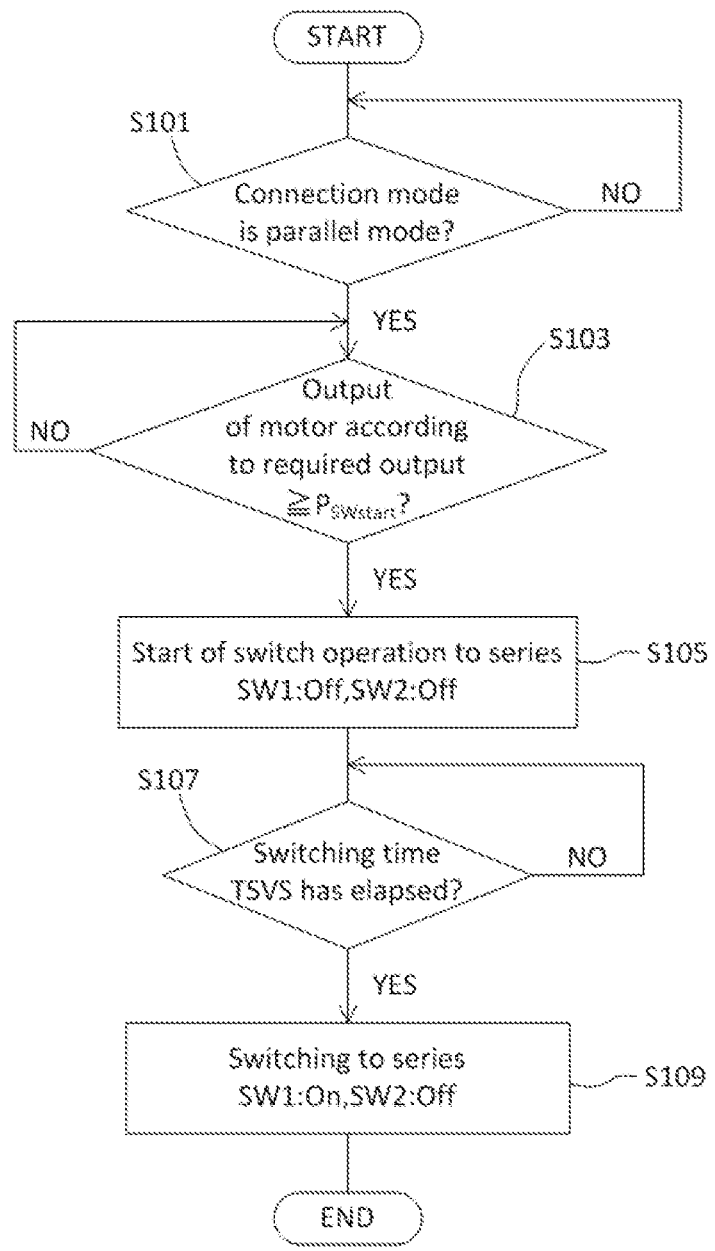
FIG. 11 is a flowchart showing a control of a series/parallel switching portion 2120 by a connection mode switching control portion 2163.

FIG. 11 is a flowchart showing the control of the series/parallel switching portion 2120 by the connection mode switching control portion 2163. As shown in FIG. 11, the connection mode switching control portion 2163 determines whether or not the connection mode is the parallel mode (step S101), and if the connection mode switching control portion 2163 determines that the connection mode is the parallel mode, the control proceeds to step S103. In step S103, the connection mode switching control portion 2163 determines whether or not the output of the motor 2107 according to the required output is equal to or greater than the switching operation starting output value $P_{SWstart}$, and if the connection mode switching control portion 2163 determines the output of the motor $2107 \geq P_{SWstart}$, the operation proceeds to step S105. In step S105, the connection mode switching control portion 2163 determines opens (off) the second switch (SW2) 2153 while keeping the first switch (SW1) 2151 of the series/parallel switching portion 2120 open (off) so as to switch the connection mode from the parallel to the series mode, shifting the connection mode from the parallel mode to the switching state. Next, when the switching time $T_{SVS}$ has elapsed since the process in step S105, the connection mode switching control portion 2163 closes (on) the first switch (SW1) 2151 while keeping the second switch (SW2) 2153 of the series/parallel switching portion 2120 open (off) (step S109), whereby the connection mode is switched to the series mode.

Thus, as has been described heretofore, in this embodiment, when the connection mode of the first battery 2103a and the second battery 2103b which make up the battery 2101 is the parallel mode, the connection mode is switched from the parallel mode to the switching state at a point in time when the output of the motor 2107 reaches the switching operation starting output value $P_{SWstart}$ which is lower than the output limit value $P_{SVSlmt}$. Consequently, even though the required output increases at the maximum changing rate thereafter, there is caused no such situation that the output of the motor 2107 exceeds the output limit value $P_{SVSlmt}$ during the switching state. As a result of this, the output according to the required output can be obtained from the motor 2107 even during the switching time when the connection mode is switched from the parallel mode is switched to the series mode, thereby making it possible to realize a sufficient drivability.

Figure 12:
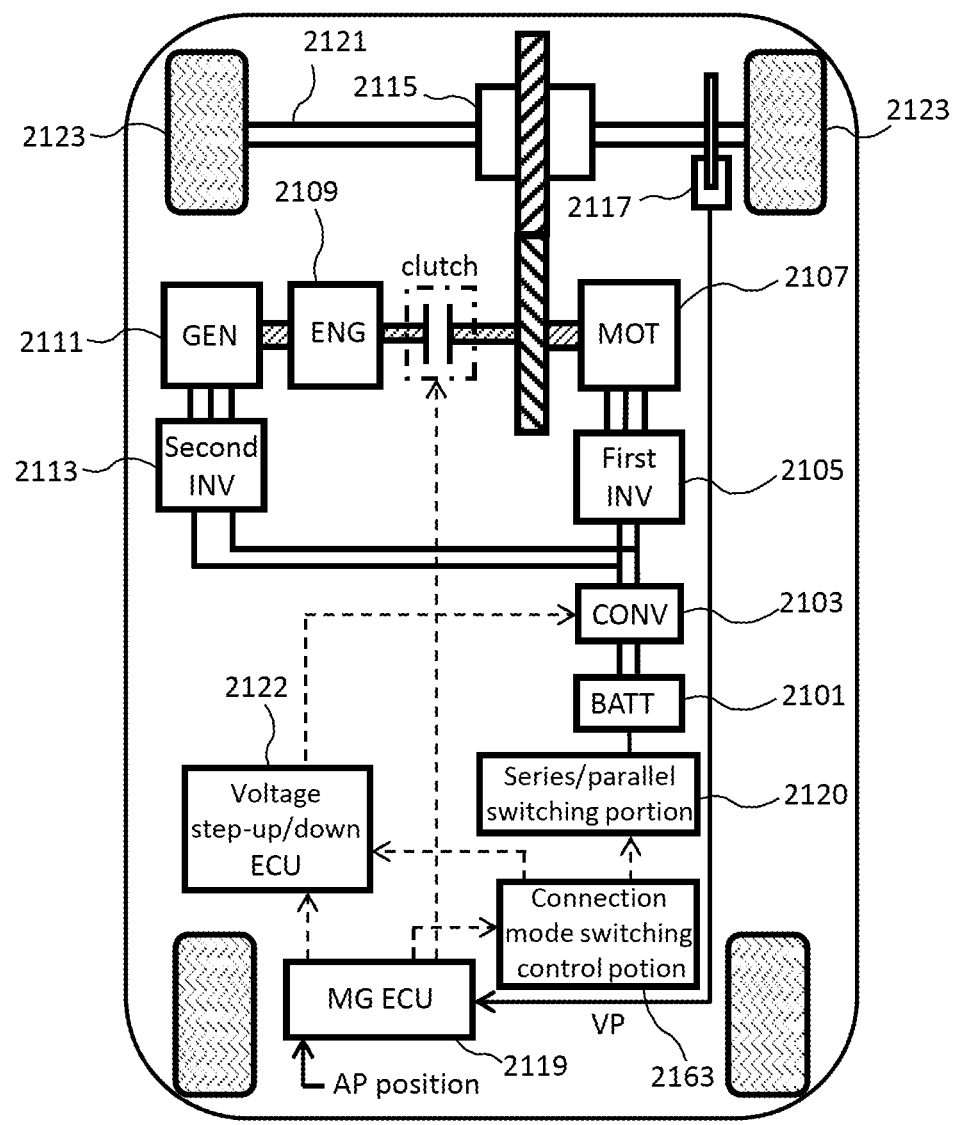
FIG. 12 is a block diagram showing an internal configuration of a series/parallel HEV.

The invention is not limited to the embodiment which has been described heretofore and hence can be modified or improved as required. In the embodiment, while the invention is described as being applied to the series system HEV, the invention can also be applied to a series/parallel system HEV shown in FIG. 12. In addition to the HEVs, the invention may also be applied to EVs (Electric Vehicles) which do not include the internal combustion engine 2109. Further, the number of batteries which make up the battery 2101 and which can be connected in series and in parallel is not limited to two, and hence, the number of such batteries may be three or more.

This patent application is based on the Japanese Patent Application (No. 2013-045708) filed on Mar. 7, 2013 and the Japanese Patent Application (No. 2013-074747) filed on Mar. 29, 2013, the contents of which are incorporated herein by reference.

DESCRIPTION OF REFERENCE NUMERALS 1101 battery (BATT)
1103 converter (CONV)
1105 first inverter (first INV)
1107 motor (Mot)
1109 internal combustion engine (ENG)
1111 generator (GEN)
1113 second inverter (second INV)
1115 gearbox (gear)
1117 vehicle speed sensor
1119, 1219 management ECU (MG ECU)
1120 series/parallel switching portion
1121 system series/parallel requiring portion
1122 voltage step-up/down ECU
1124 motor ECU
1126 generator ECU
1128 battery ECU
1129 series/parallel determination portion
1103a first battery
1103b second battery
1131H, 1131L switching device
1133 reactor
1135, 1137 smoothing capacitor
1151 first switch (SW1)
1153 second switch (SW2)
1163 connection mode switching control portion
2101 battery (BATT)
2103 converter (CONV)
2105 first inverter (first INV)
2107 motor (Mot)
2109 internal combustion engine (ENG)
2111 generator (GEN)
2113 second inverter (second INV)
2115 gearbox (gear)
2117 vehicle speed sensor
2119 management ECU (MG ECU)
2122 voltage step-up/down ECU
2124 motor ECU
2126 generator ECU
2128 battery ECU
2120 series/parallel switching portion
2163 connection mode switching control portion
2103a first battery
2103b second battery
2131H, 2131L switching device
2133 reactor
2135, 2137 smoothing capacitor
2141a, 2141b, 2141c voltage sensor
2143a, 2143b current sensor
2151 first switch (SW1)
2153 second switch (SW2)

The invention claimed is:

1. A power supply control apparatus for a vehicle comprising:
a battery portion having a plurality of batteries of which a connection mode is switched to a series mode or a parallel mode;
at least one device which can give or be given electric power to or from the battery portion; and
a series/parallel switching portion which switches the connection mode of the plurality of batteries to a series mode or a parallel mode,
the power supply control apparatus comprises:
a plurality of series/parallel requiring processing apparatuses which are provided individually for the battery portion and the device, and which output respective requirements of the battery portion and the device in relation to the connection mode of the plurality of batteries based on respective conditions of the battery portion and the device;
a series/parallel determination processing apparatus which determines which is greater in number between a series requirement and a parallel requirement in requirements outputted from the series/parallel requiring processing apparatuses, and
which determines the connection mode of the plurality of batteries to be a series mode or a parallel mode at least based on a determination of the series/parallel determination processing apparatus,
wherein the series/parallel switching portion switches the connection mode of the plurality of batteries to a series mode or a parallel mode based on a determination of the series/parallel determination processing apparatus,
wherein the device includes an motor which constitutes a drive source of the vehicle at least and which can give or be given electric power to or from the battery portion,
the series/parallel requiring processing apparatus output respective requirements of the battery portion and the device together with degrees of priority thereof, and
the series/parallel determination processing apparatus classifies the requirements outputted from the series/parallel requiring processing apparatus according to their degree of priority, and determines which is greater in number between a series requirement and a parallel requirement in requirements having a highest degree of priority in the classified requirements.

2. The power supply control apparatus according to claim 1,
wherein in a case the series/parallel determination processing apparatus determines that the number of series requirements is equal to the number of parallel requirements in the requirements having the highest degree of priority in the classified requirements, the series/parallel determination processing apparatus determines the connection mode of the plurality of batteries to be a series mode or a parallel mode according to the highest degree of priority.

3. The power supply control apparatus according to claim 1,
wherein the series/parallel determination processing apparatus determines the connection mode of the plurality of batteries to be a series mode or a parallel mode according to a connection requirement which is determined to be greater in number by the series/parallel determination processing apparatus.

4. The power supply control apparatus according to claim 1, further comprising:
a system series/parallel requiring processing apparatus which outputs a requirement in relation to the connection mode of the plurality of batteries based on an efficiency of the whole of the vehicle,
wherein the series/parallel determination processing apparatus determines which is greater in number between a series requirement and a parallel requirement based on requirements which are outputted from the series/parallel requiring processing apparatus and the system series/parallel requiring processing apparatus.

5. The power supply control apparatus according to claim 4,
wherein in a case the series/parallel determination processing apparatus determines that the number of series requirements is equal to the number of parallel requirements, the series/parallel determination processing apparatus determines the connection mode of the plurality of batteries to be a series mode or a parallel mode according to the requirement of the system series/parallel requiring processing apparatus.

6. The power supply control apparatus according to claim 1,
wherein when an output of the device is increased according to a required output for the vehicle in a state that the plurality of batteries are connected in parallel, the series/parallel determination processing apparatus starts a switching operation of switching the connection mode from the parallel mode to a series mode before the output of the device reaches an output limit value for a state where the connection mode is being switched.

7. The power supply control apparatus according to claim 6,
wherein the series/parallel determination processing apparatus starts a switching operation of switching the connection mode from the parallel mode to a series mode when the output of the device reaches a value resulting from subtracting an integrated value of a maximum value of a variation in the required output per unit time and a time which is required for the connection mode to be switched from the parallel mode to a series mode from the output limit value.

8. The power supply control apparatus according to claim 7,
wherein the maximum value of a variation in the required output per unit time is a value resulting when a rate at which the required output changes to increase is maximum with an accelerator pedal depressed to a maximum extent by a driver of the vehicle.

9. A power supply control method for a vehicle comprising:
a battery portion having a plurality of batteries of which a connection mode is switched to a series mode or a parallel mode;
at least one device which can give or be given electric power to or from the battery portion;
a series/parallel switching portion which switches the connection mode of the plurality of batteries to a series mode or a parallel mode,
a control apparatus,
the power supply control method comprising:

a series/parallel requirement receiving step of receiving respective requirements of the battery portion and the device in relation to the connection mode of the plurality of batteries based on respective conditions of the battery portion and the device, performed by the control apparatus;
a series/parallel requirement determination step of determining which is greater in number between a series requirement and a parallel requirement in the requirements performed by the control apparatus; and
a series/parallel determination step of determining the connection mode of the plurality of batteries to be a series mode or a parallel mode based on the determination at least, performed by the control apparatus;
wherein the series/parallel switching portion switches the connection mode of the plurality of batteries to a series mode or a parallel mode based on the determination,
the device includes an motor which constitutes a drive source of the vehicle at least and which can give or be given electric power to or from the battery portion,
in the series/parallel requirement receiving step, respective requirements of the battery portion and the device together with degrees of priority thereof, and
in the series/parallel requirement determination step, the requirements which are received in the series/parallel requirement receiving step are classified according to their degree of priority, and it is determined which is greater in number between a series requirement and a parallel requirement in requirements having a highest degree of priority in the classified requirements.

10. The power supply control method according to claim 9, further comprises:
a system series/parallel requirement receiving step of receiving a requirement in relation to the connection mode of the plurality of batteries based on an efficiency of the whole of the vehicle,
wherein in the series/parallel requirement determination step, it is determined which is greater in number between a series requirement and a parallel requirement based on requirements which are received in the series/parallel requirement receiving step and the system series/parallel requirement receiving step, and
in a case it is determined in the series/parallel requirement determination step that the number of series requirements is equal to the number of parallel requirements, in the series/parallel determination step, it is determined that the connection mode of the plurality of batteries is to be a series mode or a parallel mode according to the requirement received in the system series/parallel requirement receiving step.

11. The power supply control method according to claim 9,
when an output of the device is increased according to a required output for the vehicle in a state that the plurality of batteries are connected in parallel, a switching operation of switching the connection mode from a parallel mode to a series mode is started before the output of the device reaches an output limit value for a state where the connection mode is being switched.

12. A power supply control apparatus for a vehicle comprising:
a battery portion having a plurality of batteries of which a connection mode is switched to a series mode or a parallel mode;
at least one device which can give or be given electric power to or from the battery portion; and a series/parallel switching portion which switches the connection mode of the plurality of batteries to a series mode or a parallel mode, the power supply control apparatus comprises:

a plurality of series/parallel requiring processing apparatuses which are provided individually for the battery portion and the device, and which output respective requirements of the battery portion and the device in relation to the connection mode of the plurality of batteries based on respective conditions of the battery portion and the device;

a series/parallel determination processing apparatus which determines which is greater in number between a series requirement and a parallel requirement in requirements outputted from the series/parallel requiring processing apparatuses, and which determines the connection mode of the plurality of batteries to be a series mode or a parallel mode at least based on a determination of the series/parallel determination processing apparatus, wherein the series/parallel switching portion switches the connection mode of the plurality of batteries to a series mode or a parallel mode based on a determination of the series/parallel determination processing apparatus, wherein when an output of the device is increased according to a required output for the vehicle in a state that the plurality of batteries are connected in parallel, the series/parallel determination processing apparatus starts a switching operation of switching the connection mode from the parallel mode to a series mode before the output of the device reaches an output limit value for a state where the connection mode is being switched, and wherein the series/parallel determination processing apparatus starts a switching operation of switching the connection mode from the parallel mode to a series mode when the output of the device reaches a value resulting from subtracting an integrated value of a maximum value of a variation in the required output per unit time and a time which is required for the connection mode to be switched from the parallel mode to a series mode from the output limit value.

* * * * *